(12) United States Patent
Timmins et al.

(10) Patent No.: US 8,111,812 B2
(45) Date of Patent: Feb. 7, 2012

(54) TECHNIQUE FOR EMULATING AN INSTRUCTION SET IN PROVIDING ELECTRONIC MESSAGING SERVICE THROUGH AN INFORMATION ASSISTANCE PROVIDER

(75) Inventors: Timothy A. Timmins, Beaverton, OR (US); John S. Miller, Canby, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 1532 days.

(21) Appl. No.: 10/999,662

(22) Filed: Nov. 30, 2004

(65) Prior Publication Data

US 2006/0029193 A1 Feb. 9, 2006

Related U.S. Application Data

(63) Continuation-in-part of application No. 10/903,454, filed on Jul. 30, 2004.

(51) Int. Cl.
*H04M 1/64* (2006.01)

(52) U.S. Cl. ............ 379/88.04; 379/88.13; 379/265.01; 709/206

(58) Field of Classification Search .............. 379/67.1, 379/88.13, 265.01–266.1, 88.01–88.04, 93.01; 715/853; 705/1; 709/206
See application file for complete search history.

(56) References Cited

U.S. PATENT DOCUMENTS

| | | | |
|---|---|---|---|
| 6,243,445 B1 * | 6/2001 | Begeja et al. | 379/93.01 |
| 7,397,912 B2 * | 7/2008 | Aasman et al. | 379/266.03 |
| 7,489,766 B2 * | 2/2009 | Morganstein et al. | 379/88.02 |
| 7,606,718 B2 * | 10/2009 | Cloran | 705/1 |
| 7,614,014 B2 * | 11/2009 | Burgin et al. | 715/853 |
| 2005/0108338 A1 * | 5/2005 | Simske et al. | 709/206 |

* cited by examiner

*Primary Examiner* — Md S Elahee
(74) *Attorney, Agent, or Firm* — Sofer & Haroun, LLP

(57) ABSTRACT

To facilitate managing his/her email through a Voice E-mail™ service, a user is allowed to select one or more sets of commands, with which he/she is familiar or prefers, to be emulated when the user interacts with the service. With this selection in place, when a user communicates with an information assistance provider to access the service, the user is identified and the email data and data concerning the selected commands associated with the user are retrieved. The user may then manage the email data using the selected commands during the service.

46 Claims, 18 Drawing Sheets

100

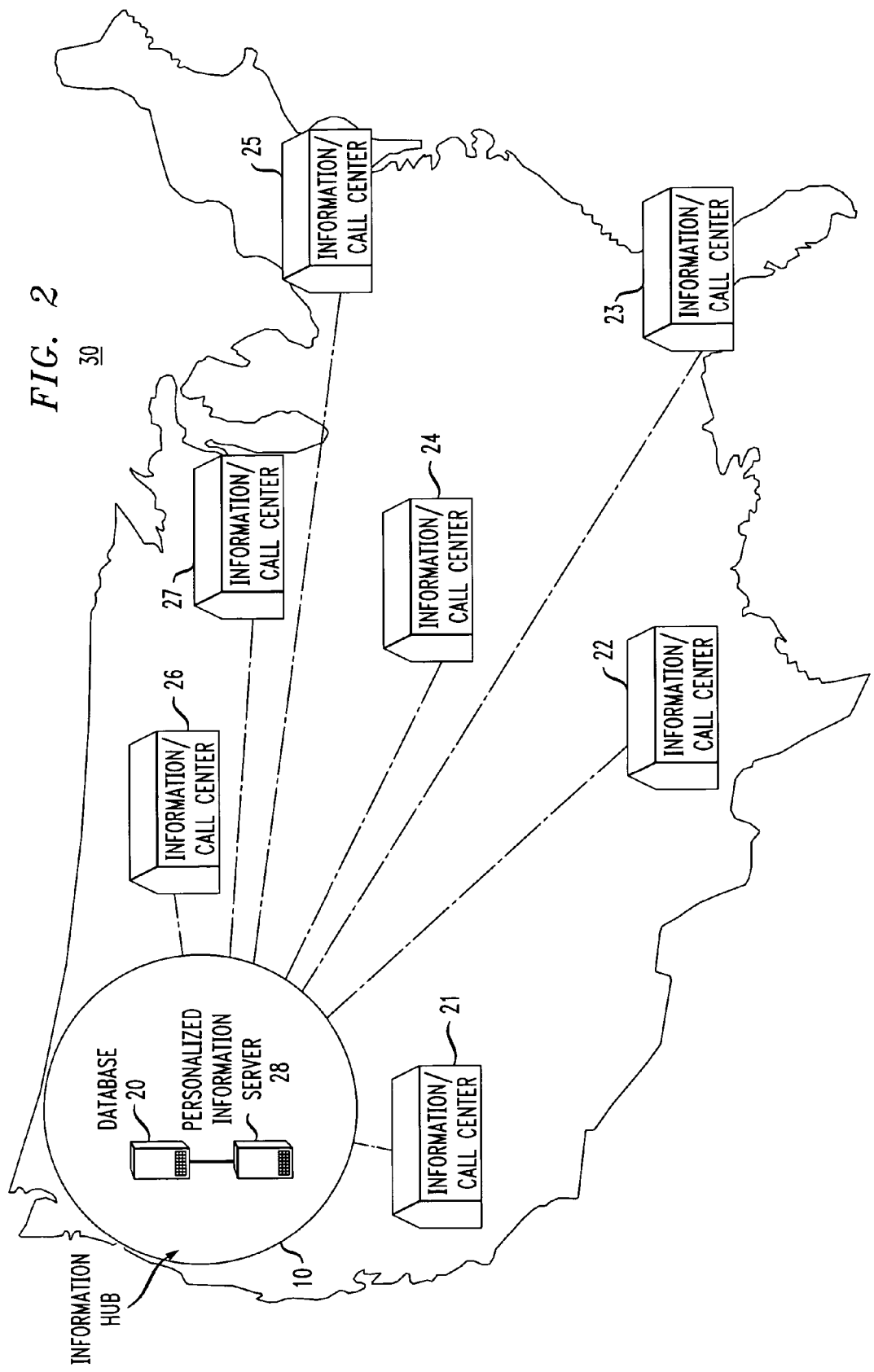

- RECEIVE FROM USER ADDRESS DATA PERTAINING TO N EMAIL ACCOUNTS — 320
- RECEIVE FROM USER ACCESS DATA FOR EACH OF THE N EMAIL ACCOUNTS — 330
- CREATE EMAIL FOLDER FOR USER — 340
- STORE DATA IN USER'S EMAIL FOLDER — 350
- INITIALIZE TIME STAMP IN USER'S EMAIL FOLDER — 360

710

| | |
|---|---|
| MR. SMITH | 720 |
| 06/14/YYYY   09:18:42 | 725 |
| DEFAULT REPLY ADDRESS | 730 |
| Address1 | 761a |
| Access_Data1 | 761b |
| Address2 | 762a |
| Access_Data2 | 762b |
| Address3 | 763a |
| Access_Data3 | 763b |

FIG. 9A

INBOX ASSOCIATED WITH Address1

| SENDER/ADDRESS | SUBJECT | DATE AND TIME |
|---|---|---|
| 791 → Mike Sullivan | New Profile Server | Thu 06/24/YY  04:55:10 p.m. |
| John McGrath | New Client | Thu 06/24/YY  09:28:13 a.m. |
| The Daily Dish | The Daily Dish – Shopping | Wed 06/23/YY  08:18:37 a.m. |
| 794 → Keld | Gooday Mate! | Sat 06/12/YY  11:07:09 p.m. |
| 795 → Sarah Chang | Good Movie Review | Fri 06/11/YY  03:20:23 p.m. |
| 796 → Mike Sullivan | Security Patch | Thu 06/10/YY  12:48:30 p.m. |
| 797 → Keld | Havin' a Good Time | Tue 06/01/YY  01:01:49 a.m. |
| 798 → GreenGrocer | Asparagus Sale | Sat 05/30/YY  07:49:07 a.m. |

FIG. 9B

INBOX ASSOCIATED WITH Address2

| SENDER/ADDRESS | SUBJECT | DATE AND TIME |
|---|---|---|
| Johannes Taylor | Good Article | Thu 06/24/YY  04:49:03 p.m. |
| Walmart.com | Discount Prices | Wed 06/16/YY  04:12:31 p.m. |
| Alexandra@aol.com | Shummalumma | Sun 06/13/YY  09:10:19 a.m. |
| Alexandra@aol.com | Shumma | Sun 06/13/YY  08:48:33 a.m. |
| Johannes Taylor | Re: Mexico | Fri 04/09/YY  05:50:12 p.m. |
| Johannes Taylor | Read This | Wed 04/07/YY  03:06:50 p.m. |

FIG. 9C

INBOX ASSOCIATED WITH Address3

| SENDER/ADDRESS | SUBJECT | DATE AND TIME |
|---|---|---|
| Jjill.com | Summer Sale | Tue 06/15/YY  04:03:00 p.m. |
| RadioShack.com | Your Order | Sat 06/12/YY  11:25:29 a.m. |
| Jane Kawasaki | Requested Documents | Mon 04/12/YY  08:55:12 a.m. |

FIG. 10
430

Today's Date: Thursday, June 24, YYYY — 448    Time: 10:43:09 a.m. — 449

451 — USERNAME  MR. SMITH
452 — NEW EMAIL MESSAGES  6          453
                             MESSAGES (TOTAL)  17

NEW MESSAGES AT  ADDRESS1

| SENDER/ADDRESS | SUBJECT | DATE AND TIME | | |
|---|---|---|---|---|
| 461 — Mike Sullivan | New Profile Server | Thu 06/24/YY 04:55:10 p.m. | OPEN | DELETE |
| 462 — John McGrath | New Client | Thu 06/24/YY 09:28:13 a.m. | OPEN | DELETE |
| 463 — The Daily Dish | The Daily Dish – Shopping | Wed 06/23/YY 08:18:37 a.m. | OPEN | DELETE |

NEW MESSAGES AT  ADDRESS2

| SENDER/ADDRESS | SUBJECT | DATE AND TIME | | |
|---|---|---|---|---|
| 471 — Johannes Taylor | Good Article | Thu 06/24/YY 04:49:03 p.m. | OPEN | DELETE |
| 472 — Walmart.com | Discount Prices | Wed 06/16/YY 04:12:31 p.m. | OPEN | DELETE |

(412)

NEW MESSAGES AT  ADDRESS3

| SENDER/ADDRESS | SUBJECT | DATE AND TIME | | |
|---|---|---|---|---|
| 481 — J.jill.com | Summer Sale | Tue 06/15/YY 04:03:00 p.m. | OPEN | DELETE |

REPLY EMAIL FORM

Date: June 24, YYYY  Time: 10:53:05

- 1332 — To:
- 1334 — From:
- 1336 — Subject:
- 1345 — (Reply Message or Attachment w/Audio File)
- 1346 — (Original Message)

FORWARD EMAIL FORM

Date:  Time:

- 1372 — To:
- 1374 — From:
- 1376 — Subject:
- 1385 — (Additional Message by User)
- 1386 — (Original Message)

Today's Date: Friday, June 25, YYYY — 448    Time: 08:18:30 a.m. — 449

451 — USERNAME [MR. SMITH]
452 — NEW EMAIL MESSAGES [7]    453 ⎧ MESSAGES (TOTAL) [17]

NEW MESSAGES AT [ADDRESS1]

| SENDER/ADDRESS | SUBJECT | DATE AND TIME | | |
|---|---|---|---|---|
| Keld | Gooday Mate! | Sat 06/12/YY 11:07:09 p.m. | OPEN | DELETE |
| Sarah Chang | Good Movie Review | Fri 06/11/YY 03:20:23 p.m. | OPEN | DELETE |
| Mike Sullivan | Security Patch | Thu 06/10/YY 12:48:30 p.m. | OPEN | DELETE |
| Keld | Havin' a Good Time | Tue 06/01/YY 01:01:49 a.m. | OPEN | DELETE |

1742 ⎯

NEW MESSAGES AT [ADDRESS2]

| SENDER/ADDRESS | SUBJECT | DATE AND TIME | | |
|---|---|---|---|---|
| Alexandra@aol.com | Shummalumma | Sun 06/13/YY 09:10:19 a.m. | OPEN | DELETE |
| Alexandra@aol.com | Shumma | Sun 06/13/YY 08:48:33 a.m. | OPEN | DELETE |

NEW MESSAGES AT [ADDRESS3]

| SENDER/ADDRESS | SUBJECT | DATE AND TIME | | |
|---|---|---|---|---|
| RadioShack.com | Your Order | Sat 06/12/YY 11:25:29 a.m. | OPEN | DELETE |

| | COMMAND TYPE | LOTUS NOTES | OPTIMUM ONLINE | YAHOO! MAIL | DEFAULT | DTMF SIGNAL |
|---|---|---|---|---|---|---|
| 2220 | CREATE | LN_NEW MEMO | OO_COMPOSE | YM_COMPOSE | DF_COMPOSE | *01 |
| 2222 | REPLY | LN_REPLY | OO_REPLY | YM_REPLY | DF_REPLY | *02 |
| 2224 | FORWARD | LN_FORWARD | OO_FORWARD | YM_FORWARD | DF_FORWARD | *03 |
| 2226 | DELETE | LN_DELETE | OO_DELETE | YM_DELETE / YM_TRASH | DF_DELETE | *04 |
| 2228 | TOOLS | LN_TOOLS | OO_OPTIONS | YM_MAIL OPTIONS | DF_OPTIONS | *05 |
| 2230 | ATTACH | LN_ATTACH | OO_ATTACH | YM_ATTACH FILES | DF_ATTACH | *06 |
| 2232 | FIND | LN_FIND | -- | YM_SEARCH MAIL | DF_SEARCH | *07 |
| 2234 | SEND | LN_SEND | OO_SEND | YM_SEND | DF_SEND | *08 |
| 2236 | DRAFT | LN_SAVE AS DRAFT | OO_SAVE DRAFT | YM_SAVE AS A DRAFT | DF_SAVE DRAFT | *09 |
| 2238 | NEW MAIL | LN_REFRESH | OO_GET MAIL | YM_CHECK MAIL | DF_CHECK MAIL | *10 |
| 2240 | DELIVERY | LN_DELIVERY OPTIONS | OO_PRIORITY / OO_REQUEST RECEIPT | -- | DF_DELIVERY OPTIONS | *11 |
| | ⋮ | ⋮ | ⋮ | ⋮ | ⋮ | ⋮ |
| 2248 | PREVIOUS MESSAGE | -- | OO_PREVIOUS | YM_PREVIOUS | DF_PREVIOUS | *15 |
| 2250 | NEXT MESSAGE | -- | OO_NEXT | YM_NEXT | DF_NEXT | *16 |
| 2252 | LIST MESSAGES | -- | OO_CLOSE | YM_BACK TO MESSAGES | DF_LIST MESSAGES | *17 |
| 2254 | ADDRESSES | LN_ADDRESS BOOK | OO_ADDRESS | YM_ADDRESS | DF_ADDRESS | *18 |
| 2256 | READ HEADER | -- | -- | -- | DF_READ HEADER | *19 |
| 2258 | OPEN MESSAGE | -- | -- | -- | DF_OPEN | *20 |
| 2260 | REPEAT | -- | -- | -- | DF_REPEAT | *21 |
| 2262 | OPERATOR | -- | -- | -- | DF_OPERATOR | *22 |

FIG. 23
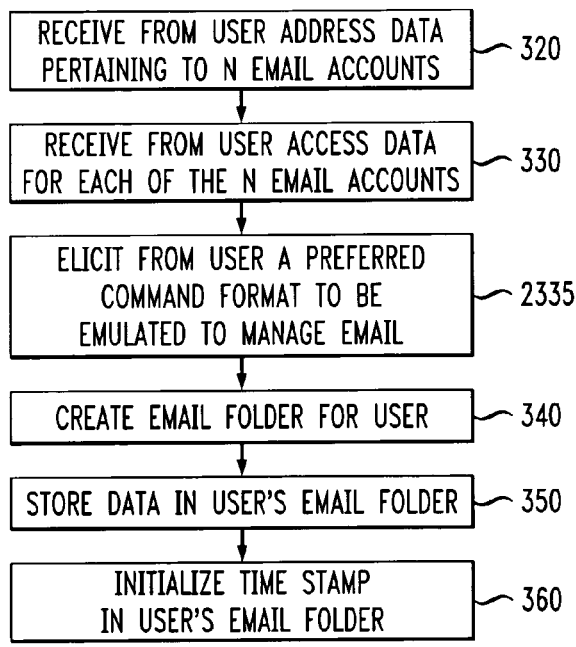
FIG. 24
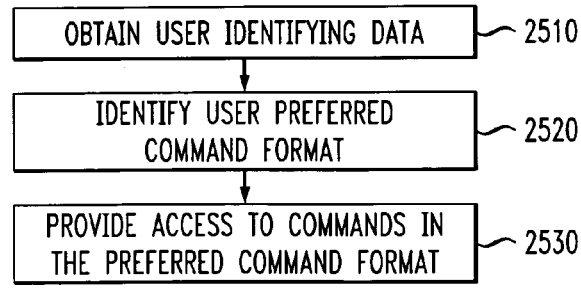
FIG. 25

TECHNIQUE FOR EMULATING AN INSTRUCTION SET IN PROVIDING ELECTRONIC MESSAGING SERVICE THROUGH AN INFORMATION ASSISTANCE PROVIDER

The present application is a continuation-in-part of U.S. application Ser. No. 10/903,454, filed on Jul. 30, 2004.

FIELD OF THE INVENTION

The invention relates to a communications system and method, and more particularly to a system and method for emulating commands of an electronic messaging service provided by an information assistance service.

BACKGROUND OF THE INVENTION

Wireless phones and devices conveniently allow users who are traveling to call and communicate with other people. In case a user cannot remember the telephone number of a contact or it is not handy, or the user wants to obtain directions and other information concerning, e.g., restaurants, theaters, etc., he or she can call an information assistance provider for assistance which may include, e.g., an operator, a voice server, etc. To that end, an expansive network of communication call centers has been established which provides users with nationwide information assistance.

Another convenient mode of communication that has become widespread is email communications. Many individuals maintain multiple email accounts with various email service providers (ESPs), such as Yahoo!, Optimum Online, AOL or privately accessible providers (such as corporations' email systems), etc., using different email service applications (ESAs), e.g., Yahoo! Mail, Optimum Online Webmail, Lotus Notes, Outlook, Palm, etc.

The recent advent of Voice E-mail™—as described in copending, commonly assigned U.S. patent application Ser. No. 10/903,454, filed on Jul. 30, 2004, incorporated herein by reference—enables a user to communicate with (e.g., by calling) an information assistance provider to receive information concerning email messages received in the user's email accounts, which may be furnished by providers unaffiliated with the information assistance provider. Data concerning access to one or more email accounts associated with a user is stored at the information assistance service. When a communication from the user is received by a directory assistance service, information concerning email messages may be provided to the user. For example, a list of email messages may be reported to the user. In addition, new email messages, e.g., email messages received since the last time the user called the information assistance service, may be reported.

Performing the various operations that are offered by Voice E-mail™ messaging services requires a user to issue and/or respond to one or more commands. However, due largely to the wide array of ESAs that exist, and because each of these ESAs typically provides its own nomenclature for effectuating email commands, the ability to provide commands with which many users are familiar has proven to be difficult. For example, to display a list of new email messages, Lotus Notes prompts its users to click a "Refresh" button, Optimum Online Webmail prompts its users to click a "Get Mail" button and Yahoo! Mail prompts its users to click a "Check Mail" button. Because many email users are accustomed to a certain command format—based upon the ESA they use—and because numerous email command nomenclatures exist, providing a Voice E-mail™ command nomenclature that is familiar to a large number of users has not been forthcoming.

SUMMARY OF THE INVENTION

The invention enhances the functionality of a Voice E-mail™ service by allowing a user to select at anytime of the service (online or offline) one or more command formats to be emulated to foster user-friendliness. The invention is premised upon the recognition that enabling a user to easily access, create and manipulate email messages is largely dependent upon the ease in which a user can navigate through the Voice E-mail™ service that handles their Voice E-mail™ accounts. Thus, the user may desire that the Voice E-mail™ service issue and respond to commands which emulate a well known command set with which the user is familiar or prefers.

For example, a user may be familiar with email commands of a specific email service application (ESA)—e.g., Yahoo! Mail, Optimum Online Webmail, Lotus Notes, etc.—and may therefore prefer to use the same or similar commands when accessing his or her messages via the Voice E-mail™ service. It should be noted that the term "commands" as used herein (also sometimes referred to as "options" or "menu options") relates to words, phrases and/or signals provided by a user, operator, voice server or some other component(s) of a Voice E-mail™ messaging service that facilitates the operation of such service. In addition, the terms "command set" and "set of commands" refer to a compilation of such words, phrases and/or signals.

In accordance with the inventive Voice E-mail™ service, first data concerning access to one or more email accounts associated with a user, and second data concerning a designation of a set of commands for managing email messages in the email accounts associated with the user are stored. When a communication from the user is established with an information assistance provider, the first and second data are retrieved. One or more email accounts are then accessed based on the first data, and at least one operation is performed with respect to at least one email message received in the email accounts on behalf of the user, wherein the operation is performed in response to a command in the set whose designation is indicated by the second data.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIG. 2 illustrates a communications system including information/call centers, in accordance with the invention;

FIGS. 9A-9C show lists of email messages received in various email accounts maintained by a user;

FIG. 10 illustrates a GUI containing information concerning email messages in a user's email accounts;

FIG. 16A illustrates an example of a reply email form;

FIG. 16B illustrates an example of a forward email form;

FIG. 20 illustrates a GUI containing information concerning the email messages resulting from the screening using the time range message filter;

FIG. 22 is a table associating command sets in different formats, in accordance with an embodiment of the invention;

FIG. 23 is a flowchart depicting a routine for eliciting from a user information concerning the user's email accounts and for identifying the user's command format preferences, in accordance with an embodiment of the invention;

FIG. 24 illustrates a record having a command format preference designation that is maintained in a user's email folder, in accordance with an embodiment of the invention; and FIG. 25 is a flowchart depicting a routine for realizing an emulation of the commands in the user's preferred command format, in accordance with an embodiment of the invention.

DETAILED DESCRIPTION

Figure 1:
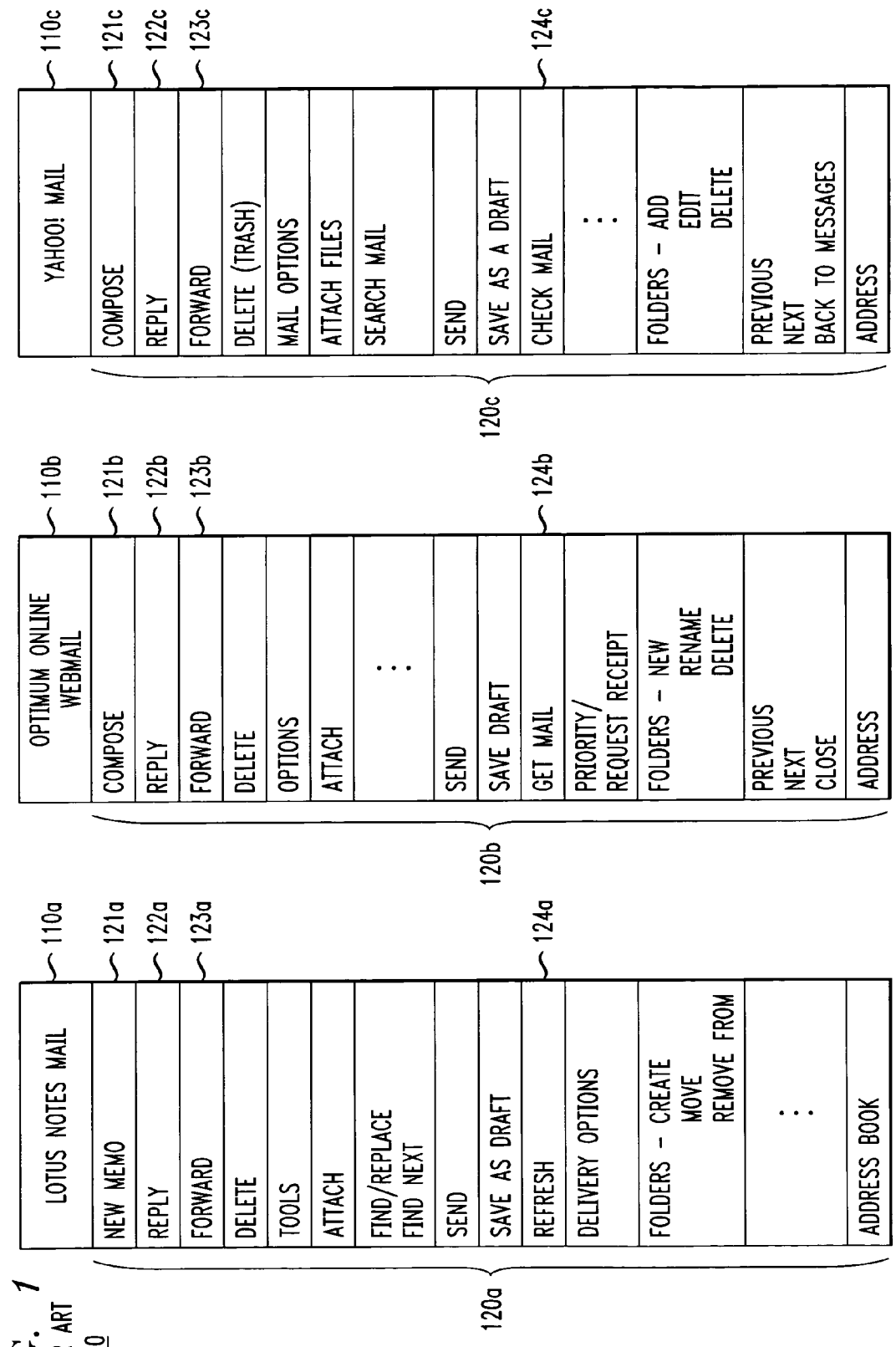
FIG. 1 is a table illustrating command sets used in well known email service applications (ESAs) in prior art.

The invention is generally directed to formatting commands used in connection with a personalized Voice E-mail™ service, and more particularly allowing a user to access and handle email via voice media using commands of a format, selected among a plurality of formats, that is specified by the user or an operator that provides the service. It should be noted that the term "operator" used herein broadly encompasses entities that are capable of providing assistance in a telecommunications environment, including without limitation human and nonhuman operators, voice response/recognition capabilities, web-/WAP-enabled operator services, and other automated and electronic access.

To facilitate tailoring the information assistance service to individuals' needs, one or more folders may be maintained for a user, based on which service is rendered to the user. For example, as disclosed in copending, commonly assigned U.S. application Ser. No. 09/865,230, filed on May 25, 2001, incorporated herein by reference, contacts folders and appointment folders may be created and maintained to store a user's contacts and appointments information, respectively. In addition, an email folder may be created and maintained to store a user's email information, e.g., data pertaining to one or more email accounts that the user wishes to access via the information assistance service. Such email accounts were previously established by the user with different email service providers (ESPs), e.g., Yahoo!, Optimum Online, AOL, privately accessible providers, etc. (which are unaffiliated with the present information assistance provider), using one or more email service applications (ESAs), such as Yahoo! Mail, Optimum Online Webmail, Lotus Notes, Outlooks, etc. With the email folder in place, when the user accesses, e.g., by calling, the information assistance service, the user may be informed of any newly arrived email messages in his/her various email accounts, may be able to learn the content of an email message and reply thereto, and may take advantage of other related services offered by the information assistance provider, as will be fully described below.

Like a contacts or appointments folder, an email folder for a user may be maintained by the information assistance service in association with an identifier of the user, e.g., the user's telephone number. Thus, in this particular illustrative embodiment, when an information assistance call is received, the subject service locates the folders associated with the caller based on an automatic number identification (ANI) associated with the call. As is well known, the ANI identifies the telephone number of the communications device from which the call originates. However, it should be noted that a user identification (ID), password, PIN, mother's maiden name, user voiceprint, etc. may be used in combination with, or in lieu of, an ANI to identify a user. For example, use of a voiceprint to identify a user is disclosed in copending, commonly assigned U.S. application Ser. No. 10/403,207 filed on Mar. 31, 2003, incorporated herein by reference.

In accordance with an embodiment of the invention, a user or the information assistance service provider may tailor the commands issued and recognized by the Voice E-mail™ system in a manner that substantially conforms with commands made available by one or more ESAs. Thus, for example, if a user is familiar with commands offered by a specific ESA, such as Yahoo! Mail, and desires to use such commands when accessing and managing email through a Voice E-mail™ service, the information assistance service provider when providing the Voice E-mail™ service can emulate the ESA commands with which the user is familiar, in accordance with the invention.

Table 100 in FIG. 1 illustrates command sets 120a, 120b and 120c, comprising representative commands used by three well known ESAs—Lotus Notes Mail 110a, Optimum Online Webmail 110b and Yahoo! Mail 110c—, respectively. In accordance with the invention, a user of the Voice E-mail™ service described below may select a preferred set(s) of commands to be emulated during the service, which may comprise (1) one or more of the well known ESA command sets or (2) a medley of commands from different well known ESA command sets and/or user made-up commands. It should be noted that the term "commands" as used herein (also sometimes referred to as "options" or "menu options") relates to words, phrases and/or signals (such as dual-tone multi-frequency (DTMF) tones) provided by a user, a user's communications device, operator, voice server or some other component(s) of a Voice E-mail™ service that facilitates the operation of such service. In addition, the terms "command set" and "set of commands" refer to a compilation of such words, phrases and/or signals.

Thus, as shown in table 100, Lotus Notes Mail ESA (denoted 110a), Optimum Online Webmail ESA (denoted 110b) and Yahoo! Mail ESA (denoted 110c) support command sets 120a, 120b and 120c, respectively, in connection with the operation of their email applications. Some of the commands listed in table 100 are common to the ESAs, and some of the commands are common to two of the three ESAs. For example, each of the listed ESAs uses a "Reply" command (as designated by 122a, 122b, 122c) to enable replying to an email message, and a "Forward" command (as designated by 123a, 123b, 123c) to enable forwarding an email message to another party. On the other hand, only Lotus Notes Mail 110a uses "New Memo" command 121a for creating a new message, whereas Optimum Online Webmail 110b and Yahoo! Mail 110c both use a "Compose" command (121b, 121c) to achieve the same functionality. In addition, to retrieve new email messages, each ESA uses a different command—i.e., "Refresh" command 124a used by Lotus Notes Mail 110a, "Get Mail" command 124b used by Optimum Online Webmail 110b and "Check Mail" command 124c used by Yahoo! Mail 110c.

In accordance with an embodiment of the invention, representative command sets 120a, 120b and 120c (as well as other command sets (not shown)) are stored in database 20 such that these commands may be accessed in connection with the provision of Voice E-mail™ service to users. Thus, if a user is accustomed to email commands of a specific ESA, e.g., Yahoo! Mail, the user may select to work with the same or similar commands when accessing the Voice E-mail™ service. Thus, in accordance with this embodiment, and as described more fully below in connection with FIGS. 22 to 25 below, such user may select for example command set 120c in connection with managing his or her messages via the Voice E-mail™ service. As a result, the user can utilize the Voice E-mail™ service to issue and respond to the same commands as if the user were managing his or her messages using Yahoo! Mail application 110c, which messages may not even be attributed to the Yahoo! ESP. In another embodiment, a user may select subsets of commands from different well known command sets, e.g., 120a, 120b and 120c, and/or invent his/her commands to make up his/her own preferred command set. For example, a user may invent a "What's up" command for checking any newly arrived email, analogous to "Refresh" command 124a in Lotus Notes Mail ESA 110a, "Get Mail" command 124b in Optimum Online Webmail ESA 110b, or "Check Mail" command 124c in Yahoo! Mail ESA 110c.

Voice E-mail™ System

FIG. 2 illustrates a communications system for providing, inter alia, a personalized Voice E-mail™ service. This communication system includes wide area network (WAN) 30 covering an extensive area. WAN 30 may be an Internet-based network such as the World Wide Web or a private intranet based network. WAN 30 connects operators dispersed throughout a wide coverage area in information/call centers 21 through 27. It should be noted that the term "operators" used herein broadly encompasses entities that are capable of providing assistance in a telecommunications environment, including without limitation human operators, voice response/recognition capabilities, web-/WAP-enabled operator services, and other automated and electronic access. One or more information hubs 10 are also included in WAN 30. An information hub 10 includes one or more personalized information servers 28 which are accessible by the operators in the system, and one or more databases 20 in which users' email, contacts, appointments and other folders may be stored and maintained. Such folders may also be stored locally at one or more of the information/call centers. The folders and information at different centers are synchronized. Synchronized databases provide necessary backup as well as support to roaming mobile device users.

Figure 3A:
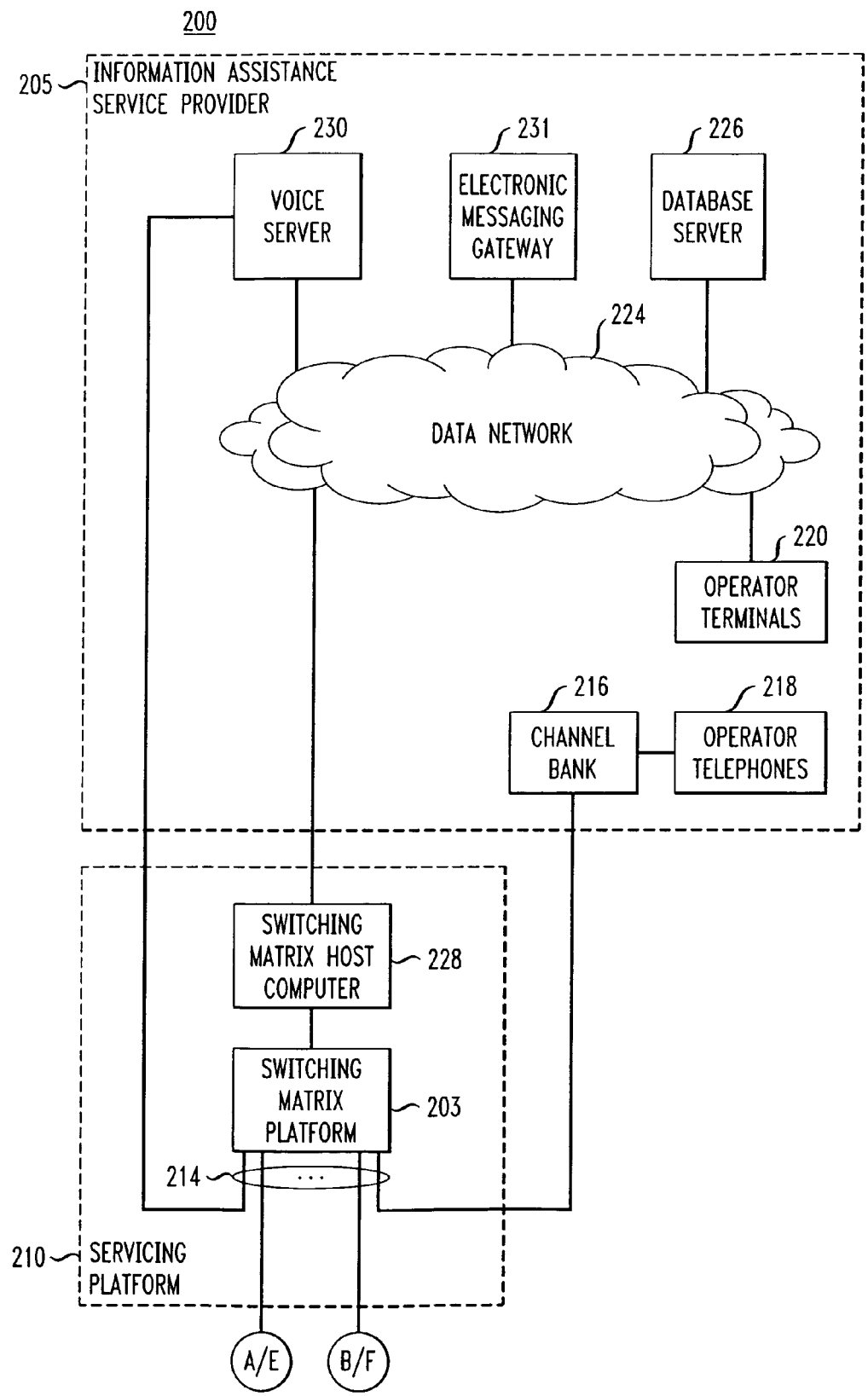
FIGS. 3A and 3B are block diagrams of components of the communications system of FIG. 2.
Figure 3B:
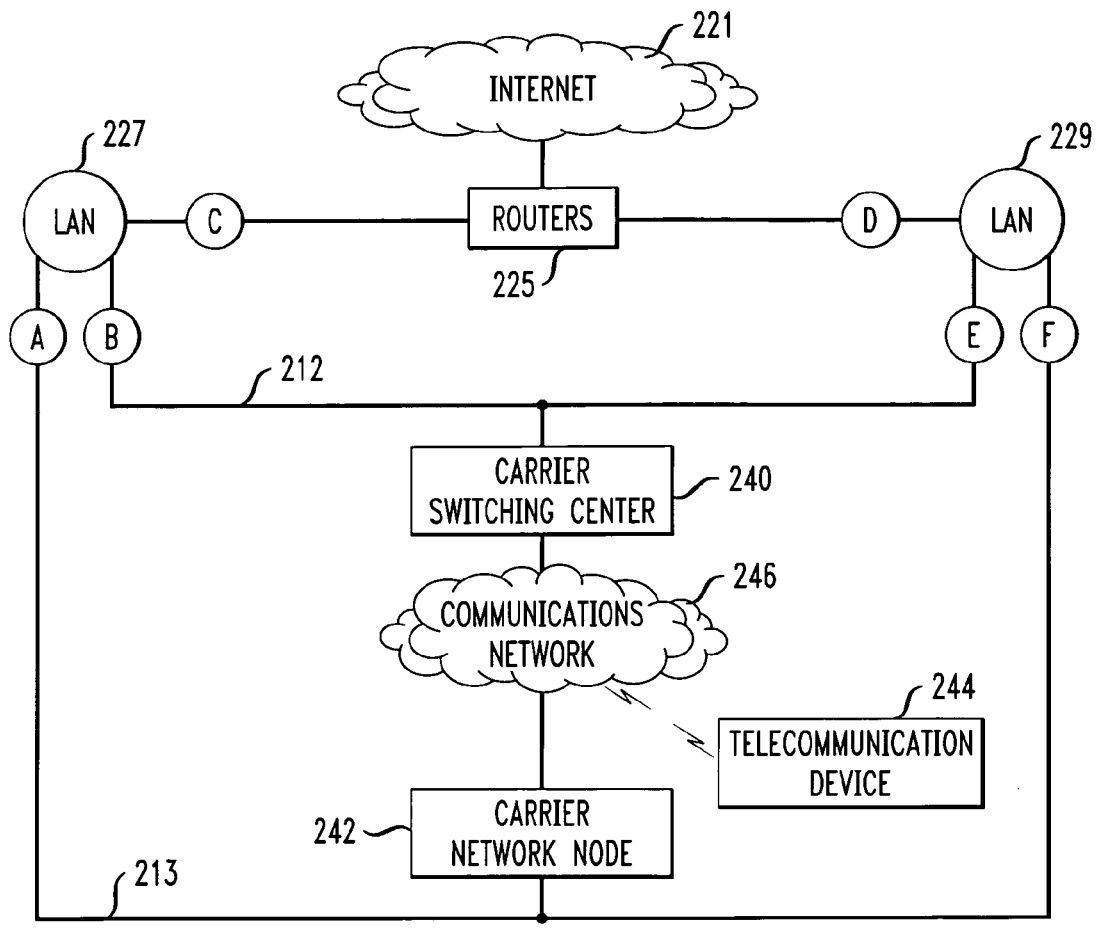

Referring to FIGS. 3A and 3B, information/call center 200 (which generically represents one of aforementioned information/call centers 21 through 27) is attended by operators, which includes information assistance service provider 205 and servicing platform 210. It should be noted that even though both provider 205 and servicing platform 210 appear in the same figure, they may or may not be located in the same geographic area. Servicing platform 210 comprises switching matrix host computer 228, and switching matrix platform 203 which is connected via T1 communication links 214 to, among others, voice server 230 and channel bank 216 in provider 205.

Channel bank 216 is used to couple multiple operator telephones 218 to platform 203. The operators in center 200 are further equipped with operator terminals 220, each of which includes a video display unit and a keyboard with associated dialing pad. Operator terminals 220 are connected over data network 224 to one or more database server(s) 226 (although only one is shown here). Database server 226 provides access to, among others, directory information from multiple sources. Database server 226 enables the operator to search directory information not just by name and address (sometimes city or area code) of a desired party, but also by type of goods/services and/or geographical region of a desired entity.

Data network 224 further connects to voice server 230, electronic messaging gateway 231, and switching matrix host computer 228, which in turn is connected to switching matrix platform 203 via a data link. Data network 224 includes, but is not limited to, local area network (LAN) 227, best seen in FIG. 3B. LAN 227 may connect to other similar remote LANs 229 to form WAN 30 in FIG. 2. LANs 227 and 229 are connected to one another and to Internet 221 via routers 225.

A user's telephone, computer, PDA or other telecommunication device 244 communicates via communications network 246 which is connected to carrier network node 242 and carrier switching center 240. T1 voice links 212 provide connection between the information/call center's switching matrix platform 203 and carrier's switching center 240, through which incoming information service calls are received. T1 voice links 212 further provide connection to the carrier switching center 240 through which outgoing calls are placed over communications network 246 (which network may be different than that used for incoming calls). Similarly, T1 data links 213 provide a signaling connection between the information/call center's node (not shown) and carrier network node 242, through which incoming and outgoing signaling messages are transported. The information/call center node is contained within switching matrix platform 203, but one with skill in the art will appreciate that the information/call center node could also be a physically distinct component.

The operation of switching matrix platform 203 is governed by computer-readable instructions stored and executed on switch matrix host computer 228. In this illustrative embodiment, platform 203 includes, inter alia, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on center 200 and platform 203 for each corresponding function.

Voice server 230 is connected via data network 224 to computer 228 (to which it acts as a slave processor) and via one or more T1 links to switching matrix platform 203. Each voice server 230 when more than one is employed in information/call center 200, connects to switching matrix platform 203 via a separate T1 link. Voice server 230 comprises a general purpose computer incorporating one or more voice cards, which serve as the interface between server 230 and the T1 span to switching matrix platform 203. One such voice card in server 230 monitors and controls communications over the T1 span. Its capabilities include telephone tone (e.g., DTMF or MF) detection and generation, voice recording and playback, and call progress analysis. Voice server 230 in this instance also contains a voice recognition device for receiving verbal input from a party connected thereto. Voice server 230 is employed to play the constantly repeated parts of an operator's speech, including, for example, the caller's desired telephone number where requested, and possibly other information. At appropriate stages in a call progression, switch matrix host computer 228 initiates a voice path connection between voice server 30 and switching matrix platform 203 such that the user, or the user and the operator, are able to hear whatever pre-recorded speech is played on that connection by voice server 230. Computer 228 then instructs voice server 230, via data network 224, what type of message to play, and passes data parameters that enable voice server 230 to locate the message appropriate to the call state.

Figure 4:
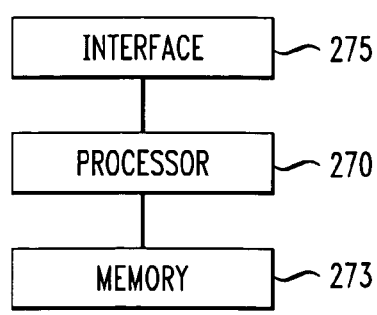
FIG. 4 is a block diagram of an electronic messaging gateway in the communications system of FIG. 2.

FIG. 4 illustrates electronic messaging gateway 231, which includes processor 270, memory 273 and interface 275. Instructed by software stored in memory 273, processor 270 is configured for communicating with email servers through interface 275, which may be, e.g., POP3 (Post Office Protocol Version 3) or IMAP (Internet Message Access Protocol) compliant email servers. Interface 275 provides processor 270 with access to data network 224 and thence to Internet 221. For example, in response to signals from terminal 220, processor 270 may initiate Internet access and communicate with email servers operated by such ESPs as Yahoo!, Optimum Online, etc. Processor 270 causes one or more email messages in a user's specified email accounts to be downloaded from the email servers, or alternatively may obtain data describing the email messages without downloading the actual email messages. Selected portions of the messages or data may be transmitted to terminal 220 for presentation to a human operator who in turn conveys the same to the user, or to voice server 230 which communicates the same to the user in automated voice.

Users of a particular telephone carrier may dial, speak or otherwise communicate predetermined access digits, access codes or retail numbers, or input a predetermined address or a Uniform Resource Locator (URL) established for information assistance by that company. The instant example assumes that the user dials, e.g., "411," "*555," "555-1212," "1-800-555-1212," "00," or other designated access numbers. The participating telephone company's own switching system will then reroute the call to information/call center 200 (via a T1 channel), where it appears as an incoming call.

Automatic call distribution (ACD) logic is used to queue (if necessary) and distribute calls to operators in the order in which they are received, and such that the call traffic is distributed evenly among the operators. In other embodiments, other distribution logic schemes may be utilized, such as skills-based routing based on, e.g., a preferred call handling method specified by a user profile, or a priority scheme for preferred callers. The queue is maintained by switching matrix host computer 228.

Voice E-mail™ Service

To subscribe to the personalized Voice E-mail™ service, the user may call an operator at the designated access number. As part of the registration, the operator enters at a user data web page on server 28 user identifying information including username, password, and telephone number of the particular telecommunications device, e.g., a wireless telephone in this instance, which the user would use to call the information assistance service in the future. It is particularly advantageous to use such a phone number (also known as a mobile directory number (MDN) in the case of a wireless phone number) to identify the user since, as described before, the calling number would be automatically captured as an ANI at information/call center 200 when the user calls. Specifically, platform 214 in center 200 in a well-known manner derives the ANI from the call set-up signals associated with the user's call.

During the registration (or thereafter), the operator may also ask the user which email accounts he/she wishes to have associated with the personalized Voice E-mail™ service. The user responds by identifying, say, N, email accounts, where N is an integer greater than or equal to one. In an alternative embodiment, the user may respond to the same set of questions posed by the operator during an online registration (or thereafter). Thus, as part of the registration, email address information pertaining to the user's N email accounts is received from the user, as indicated at step 320 in FIG. 5. For example, the user may provide such email addresses as smith@yahoo.com, smith@optimumonline.net, etc. It may be necessary to prompt the user to provide sufficiently detailed information to enable electronic messaging gateway 231 to access the specified email accounts. For example, at step 330, the operator elicits and receives from the user access data for each of the N email accounts. Access data may include, e.g., a username, password, etc., associated with each email account. In addition, as described below with reference to FIGS. 23 and 24, a user may also specify a command set which describes the format of commands that are provided and recognized by the Voice E-mail™ service. At step 340, an email folder is created for the user in database 20. As mentioned before, such an email folder may be stored in databases 20, in association with the user's identification data (such as an ANI) for the user's access to his/her email accounts. At step 350, the user's name (and other identifying information, if any), the email account addresses, and the email account access data are stored in a record in the user's email folder.

Figures 5, 6:
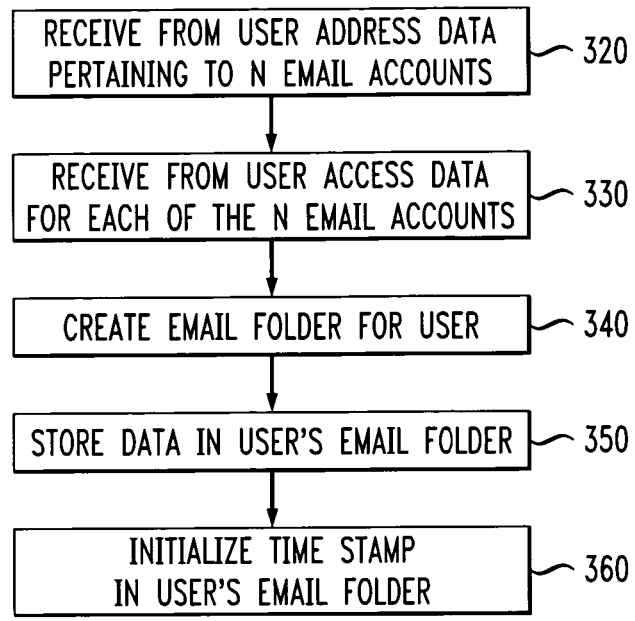
FIG. 5 is a flowchart depicting a routine for eliciting from a user information concerning one or more email accounts.
FIG. 6 illustrates a record maintained in a user's email folder.

FIG. 6 illustrates one such record 710 that may be maintained in an email folder of a hypothetical user named Mr. Smith. Record 710 comprises fields 720, 725, 730, 761*a-b*, 762*a-b* and 763*a-b*. In this example, field 720 contains Mr. Smith's name. Field 725 contains a time stamp representing a date and time at which Mr. Smith most recently called the information assistance service and accessed the personalized Voice E-mail™ service. Fields 761*a* and 761*b* respectively contain the email address (Address1) of Mr. Smith's first email account and access data (Access_Data1) therefor provided by Mr. Smith. Fields 762*a* and 762*b* respectively contain the email address (Address2) of Mr. Smith's second email account and access data (Access_Data2) therefor provided by Mr. Smith. Fields 763*a* and 763*b* respectively contain the email address (Address3) of Mr. Smith's third email account and access data (Access_Data3) therefor provided by Mr. Smith. It should be noted that although in this example, data for three email accounts is maintained in record 710, in alternative embodiments data for any number of email accounts may be maintained.

Returning briefly to FIG. 5, at step 360, the time stamp in field 725 of record 710 is initialized with the current time for future reference. Subsequently, the time stamp is updated every time the user checks his/her email through the personalized Voice E-mail™ service.

The operator may also ask the user if he/she wishes to specify a default reply address for recipients of the user's email messages to reply thereto. If the user specifies a default reply address, e.g., one of Address1, Address2 and Address3 in the Mr. Smith case, the default reply address is registered in field 730 of record 710.

Figure 7:
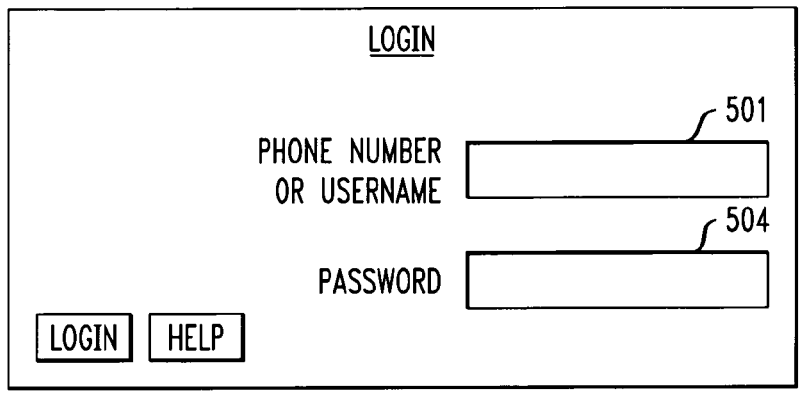
FIG. 7 illustrates a Login graphical user interface (GUI) for providing personalized information and communications services.

The user may subsequently use telecommunications device 244, e.g., a wireless phone, to call the information assistance service. Let's say the call is routed to information assistance/call center 200 where an operator attends to the call. After the user communicates his/her needs, e.g., to access the personalized Voice E-mail™ service, the operator at terminal 220 establishes communications with personalized information server 208 through WAN 30 (or alternatively Internet 221). In response, server 28 presents on terminal 220 a Login graphical user interface (GUI), which is illustrated in FIG. 7. As shown in FIG. 7, the operator is prompted to enter the user's phone number or username to identify the user, and a password to verify that the user is authorized to access the information assistance service. The ANI received from his/her communication device may be automatically provided in entry 501 of the Login GUI by server 28, thereby obviating the need of the operator's eliciting from the user, and entering, the required phone number or username. (In the event that such an ANI is not automatically available, or where the user is accessing the subject service from an unknown point or the operator suspects that the user calls from a phone number other than the registered phone number, the operator may verify/obtain the necessary identifying information with/from the user.) At entry 504, the operator enters the password provided by the user to complete the login process. The login information is then transmitted to server 28, where it checks the aforementioned user data web page to verify the received ANI and password. After they are verified, server 28 identifies the user's email folder based on the ANI. A copy of the user's email folder is provided to electronic messaging gateway 231.

Figure 8:
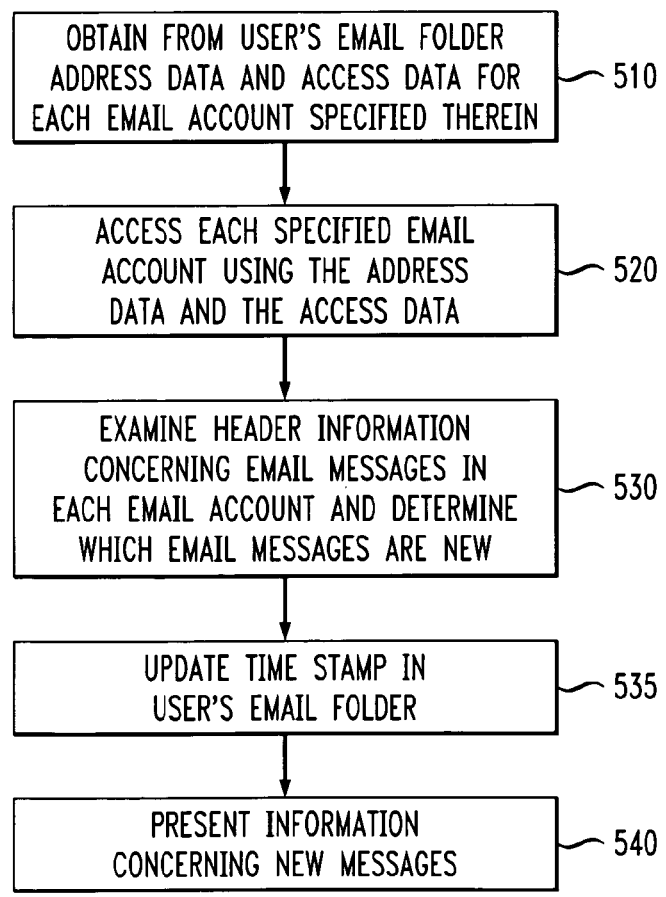
FIG. 8 is a flowchart depicting a routine for providing information concerning statuses of a user's email accounts.

Let's suppose, for example, that Mr. Smith calls the information assistance service, and after his authorization is established, he asks the operator to tell him how many new email messages are in his email accounts. The operator may select a predetermined option on the screen of terminal 220, and in response, gateway 231 uses the information in Mr. Smith's email folder, and in particular record 710 therein, to access his email accounts. FIG. 8 is a flowchart depicting a routine for providing information pertaining to a user's email accounts. At step 510, gateway 231 obtains from record 710 the address data for each email account listed therein and the access data for each such account. In the illustrative example, gateway 231 examines fields 761-763 and retrieves the addresses and access data for Mr. Smith's email accounts with three different ESPs. At step 520, gateway 231 accesses each of the specified email accounts using the address and access data. Gateway 231 may communicate, via Internet 221, with the corresponding email servers at their respective URLs pursuant to a standard protocol such as IMAP or POP3. In particular, IMAP allows a client to access and manipulate email messages on the server. For example, IMAP allows a client to obtain the header information, e.g., the email sender name and/or origination address, subject of the email, email receipt time, etc., apart from the body of the email message. IMAP also permits manipulation of remote "mailboxes," in a way that is functionally equivalent to local mailboxes. IMAP further allows for creating, deleting, and renaming mailboxes; checking for new messages; permanently removing messages; setting and clearing flags, and other functions including parsing and searching. In accordance with IMAP, each email message stored on an email server is given a unique email message identifier (message ID). When a client inquires about or retrieves an email message from a server, the client can retrieve the associated message ID as well.

After accessing Mr. Smith's email accounts, gateway 231 examines header information for the emails in each account. By way of example, gateway 231 may access Mr. Smith's email accounts at Address1, Address2 and Address3, and determine contents of inboxes of the accounts, illustrated in FIGS. 9A-9C, respectively. FIG. 9A illustrates the content of the inbox associated with Address1, which includes such header information as the name of the sender (if provided, otherwise the sender's email address), subject information, and a receipt time stamp for each of eight email messages received in Mr. Smith's email account at Address1. For example, referring to entry 791, an email was received from Mike Sullivan concerning the subject "New Profile Server" on Thursday, Jun. 24, YYYY, at 4:55:10 p.m. FIG. 9B illustrates similar information for Mr. Smith's email inbox associated with Address2; FIG. 9C illustrates similar information for his email inbox associated with Address3.

Returning to FIG. 8, at step 530, gateway 231 examines the header information concerning the email messages in each email account and determines which email messages are new. To determine which email messages are new, gateway 231 examines the receipt time stamp associated with each email message and designates as "new" any email message that was received after the date and time specified in field 725 of record 710. For example, referring again to entry 791 in FIG. 9A, the email message from Mike Sullivan was received on Jun. 24, YYYY at 4:55:10 p.m., which is after the Jun. 14, YYYY, 09:18:42 time stamp in field 725 of record 710 in Mr. Smith's email folder; accordingly, the email message from Mike Sullivan is designated as a new email message. On the other hand, referring to entry 798, the email message from GreenGrocer concerning "Asparagus Sale" was received on Saturday, May 30, YYYY at 7:49:07 a.m., which is before the Jun. 14, YYYY, 09:18:42 time stamp in Mr. Smith's email folder; accordingly, the GreenGrocer email is not new. It should be noted that in an alternative embodiment, a user may configure message filter parameters in his/her email folder to redefine the test for "new" email messages. This function is discussed in more detail below.

At step 535, gateway 231 updates the time stamp in field 725 of record 710 to indicate that the Mr. Smith has checked his email. In this example, gateway 231 updates field 725 with the current date and time. At step 540, gateway 231 presents to the operator on terminal 220 a GUI, such as that shown in FIG. 10, containing information concerning the new email messages in Mr. Smith's email accounts.

GUI 430 in FIG. 10 displays summary data including, e.g., Mr. Smith's name at username entry 451, the number of new email messages in the user's email accounts (452) the total number of messages in the user's email accounts (453), and the current date (448) and time (449). Below the summary data, GUI 430 displays header information for each new email message present in the user's email accounts. For example, referring to entries 461-463, three new email messages are present in Mr. Smith's first email account at Address1. Similarly, two new email messages (entries 471-472) are present in Mr. Smith's second email account at Address2, and one new email message (entry 481) is present in Mr. Smith's account at Address3. In this example, GUI 430 displays, for each new email message, header information including the sender's name and/or email address, a subject line description, and the date and time the email message was received.

Figure 11:
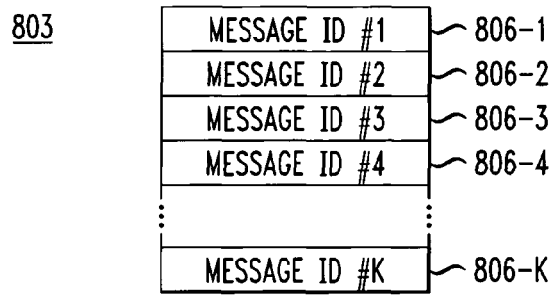
FIG. 11 illustrates a list of message IDs for selected email messages.

In an alternative example, gateway 231 determines whether or not an email message in an email account is new based on its message ID. In this example, a list of message IDs is maintained in the user's email folder. The list holds message IDs of email messages that have been opened and read to the user. Accordingly, each time an information assistance provider opens and reads an email to the user, the message ID of the respective email is added to the message ID list in the user's email folder. FIG. 11 illustrates one such message ID list (denoted 803), which comprises K message ID entries 806-1 through 806-K, where K represents an integer. In one instance, message IDs are deleted from list 803 a predetermined period of time after being added.

Figure 12:
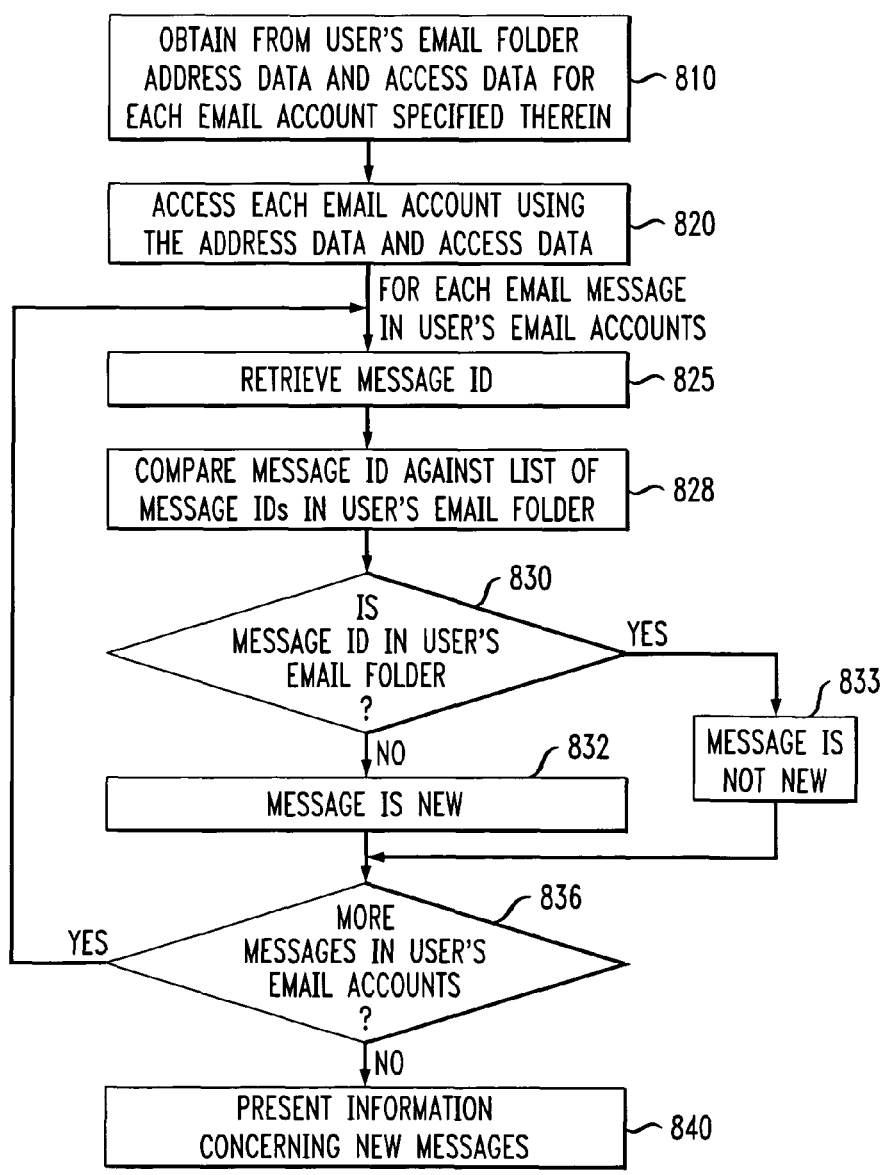
FIG. 12 is a flowchart depicting a routine for providing information concerning newly arrived email messages.

FIG. 12 illustrates a routine for providing information pertaining to a user's email accounts, in accordance with the alternative example. Steps 810 and 820 are identical to steps 510 and 520 in the routine of FIG. 8. Thus, gateway 231 obtains address data and access data from the user's email folder (step 810), and accesses each specified email account (step 820). For each email message in the user's email accounts, gateway 231 retrieves its message ID (step 825), and compares the message ID against the entries of list 803 (step 828). As indicated at block 830, if the message ID is not currently in list 803 (i.e., in the user's email folder), the email message is new (block 832). If the message ID is currently in list 803, the email message is not new (block 833). As indicated by block 836, after all the email messages in the user's accounts are examined, gateway 231 presents information concerning the new email messages on terminal 220 at step 840. It should be noted that other methods for identifying email messages (e.g., by sender's name and time of receipt) may be similarly used to determine whether or not a message is new.

Returning to FIG. 9, upon viewing GUI 430, an operator may inform Mr. Smith of the statuses of his email accounts. For example, the operator may state, "Mr. Smith, you have six new messages in your email inboxes." The operator's status message may be varied. For example, the operator may alternatively state, "Three messages have arrived today. There are seventeen messages in your inboxes." The particular style of presentation of the email account statuses may be specified during the service registration, and recorded in the user's email folder for future reference.

The user's email account status information may alternatively be conveyed by voice server 230 to the user in automated voice. The user may also be provided with a menu of selectable options including, for example: "Compose," "Attach," "Send," "Read Headers," "Open," "Next," "Previous," "Delete," "Menu," "Forward," "Reply," "Repeat," and "Operator." It should be noted that, as described with regard to FIGS. 22 to 24 below, the nomenclature respecting one or more menu options that is provided and recognized by voice server 230 (also referred to as commands) may be selected by the user, in accordance with the invention.

When the "Read Headers" option is selected, e.g., by saying "Read Headers" or pressing a predetermined key on the telephone, gateway 231 initiates a "Read Headers" routine, causing voice server 230 to begin reading the header information for the new email messages. This may be done without prompting or an explicit selection of an option by the user. Thus, referring to FIG. 10, voice server 230 may automatically read the header information for the message from Mike Sullivan, then read the header information for the message from John McGrath, etc. For example, voice server 230 may announce:

"Received today from Mike Sullivan, subject New Profile Server,"
"Received today from John McGrath, subject New Client,"
"Received on Jun. 23, YYYY from The Daily Dish, subject The Daily Dish—Shopping,"
"Received today from Johannes Taylor, subject Good Article,"
etc.

Voice server 230 may also read the addresses listed in the 'To:' field and/or the addresses listed in the 'cc:' field of each email message. Additionally, voice server 230 may inform the caller of the existence of any attached files in an email message. In another instance, the operator may read the header information and other information in response to a request by the user.

It should be noted that at any time during a user's interaction with voice server 230, the user may state "Menu" (or, alternatively, press a predetermined key on his/her telephone) to cause a list of currently available options to be played. For example, if Mr. Smith says "Menu" at any time during the "Read Headers" routine, the "Read Headers" routine stops and voice server 230 reads a menu of options, such as "Read Headers," "Open," "Next," "Previous," "Delete," "Menu," "Forward," "Reply," "Repeat," and "Operator."

Figure 13:
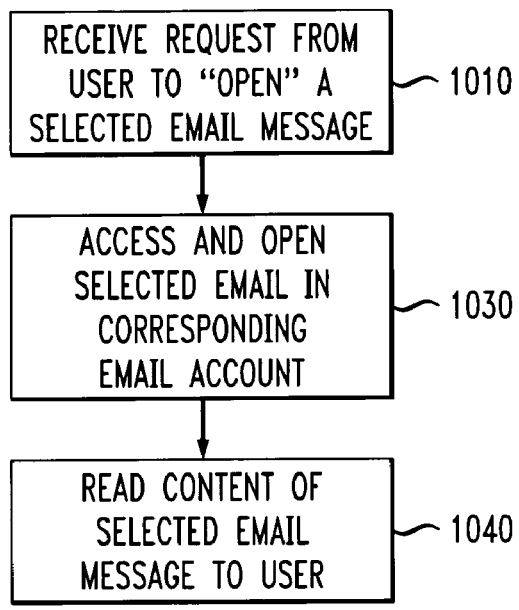
FIG. 13 is a flowchart depicting a routine for opening and reading an email message.

Continuing with the above example, while the header information is being read, Mr. Smith may request that a particular email message be opened and read. For example, after voice server 230 reads the header information for the email message from Johannes Taylor, Mr. Smith may say "Open" (or press a predetermined key on his telephone). FIG. 13 illustrates a routine for opening and reading an email message in response to Mr. Smith's request. At step 1010, voice server 230 receives a request to open a selected email message from Mr. Smith when he says "Open". In response, voice server 230 signals Gateway 231 to access and open the selected email message (step 1030). Alternatively, on hearing Mr. Smith's request, the operator attending to the call may select the email message in question, e.g., by selecting on the "Open" option 412 to the right of the Johannes Taylor message header information. After the email message is opened, voice server 230 at step 1040 reads the content of the email to Mr. Smith by means of a conventional text-to-voice conversion application. In the alternative embodiment described above, after an email message is opened and read, its message ID is added to list 803 in the user's email folder.

Figure 14:
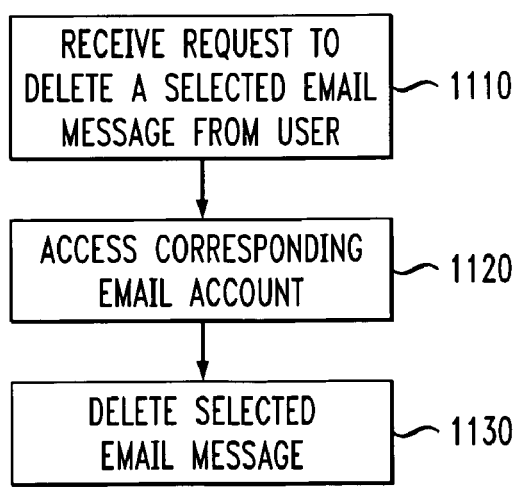
FIG. 14 is a flowchart depicting a routine for deleting an email message.

While a email message is being read or after it has been read by voice server 230, a user is provided with multiple options. For example, the user may wish to delete the message. FIG. 14 is a flowchart depicting a routine for deleting an email message in response to a user's request. Suppose that after hearing the email message from Johannes Taylor, Mr. Smith wishes to delete it. Accordingly, he may say "Delete" either during or within a configurable amount of time after the selected email message is read. Mr. Smith's request to delete the selected email message is received by voice server 230 at step 1110. In response, server 230 signals gateway 231 to access the corresponding email account, as indicated at step 1120, which is in this instance Mr. Smith's email account at Address1. At step 1130 gateway 231 causes the selected email message to be deleted. Mr. Smith may be provided with an opportunity to confirm his choice before the message is deleted. For example, voice server 230 may state, "This message will be deleted from you email account. To cancel this action press '1' now." Thus, to confirm his decision to delete the message, Mr. Smith may press '1' on his telephone.

If while a message is being read, the user wishes to skip the remainder of the message and hear header information for the next message immediately, the user may say "Next." In response, voice server 230 stops reading the current email message, and gateway 231 activates the "Read Headers" routine, causing voice server 230 to read the header information concerning the next email message. Similarly, the user may say, "Previous" to listen to the header information concerning a previous email message. In response to the user's request, voice server 230 stops reading the current message, and gateway 231 activates the "Reader Headers" routine, starting with the email message immediately prior to the current message. If the user wishes to return immediately to the operator, he/she may say "Operator," or alternatively press "*" on the telephone one or more times to exercise a "starback" feature as described, e.g., in U.S. Pat. No. 5,797,092. In response, voice server 230 stops reading the email message, and the user is reconnected to the operator. If the user wishes to hear a message again after it has been read, he/she may say, "Repeat," and in response, voice server 230 reads the message again to the user.

Figure 15:
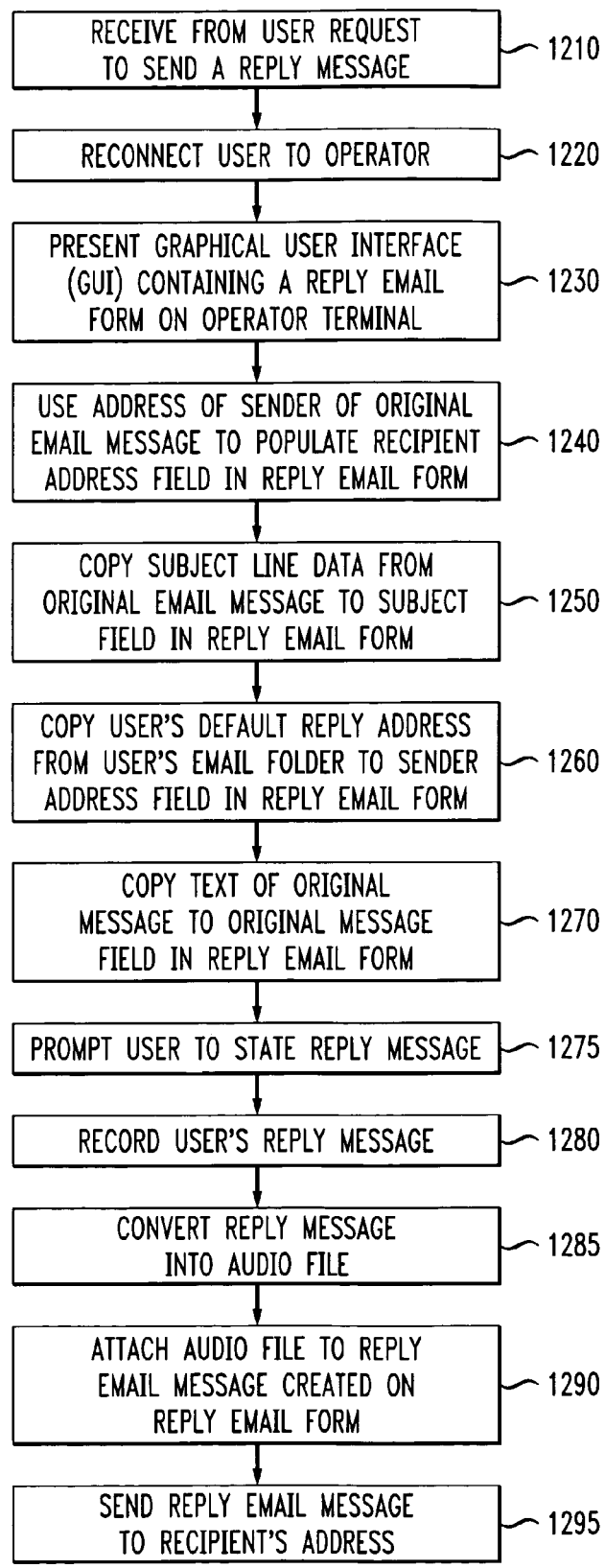
FIG. 15 is a flowchart depicting a routine for creating and sending a reply email message.

Let's suppose that after hearing the Johannes Taylor message, instead of deleting the message, Mr. Smith wishes to send a reply email message. Accordingly, he may say, "Reply," or, alternatively, press a predetermined key on his telephone. FIG. 15 illustrates a routine for creating and sending a reply email message in response to a user's request. At step 1210, the request for sending a reply message is received from Mr. Smith. At step 1220, Mr. Smith is reconnected to the operator, and at step 1230, gateway 231 presents a GUI containing a reply email form to the operator on terminal 220. FIG. 16A illustrates an example of a reply email form 1330 that may be presented on terminal 220. Form 1330 comprises fields 1332, which holds an address of the intended recipient of the reply message, field 1334, containing an address of the sender of the email (which in the case of a reply email message is the address of the user), and field 1336, containing a description of the subject of the message. Fields 1345-1346 contain the reply message and the original message, respectively.

Several fields in form 1330 are populated automatically based on the header information in the original email message. Thus, at step 1240, gateway 231 retrieves the address of the sender of the original email message (in this instance, the address of Johannes Taylor) and uses it to populate recipient address field 1332 in Voice E-mail™ form 1330. At step 1250, gateway 231 copies the subject line data from the original email message to subject field 1336 in form 1330. At step 1260, gateway 231 accesses Mr. Smith's email folder, retrieves Mr. Smith's default reply address from field 730 in record 710, and enters the default reply address into sender address field 1334 of form 1330. At step 1270, gateway 231 copies the text of the original message to original message field 1346 of form 1330.

At this point, Mr. Smith is connected to voice server 230 to create a voice audio file, which may be in an MP3 format. At step 1275, Mr. Smith is prompted to utter his reply message. For example, either the operator or voice server 230 may announce, "Please speak your reply message at the tone; it will be recorded as an audio file and sent as an attachment to your reply message." At step 1280, voice server 230 records Mr. Smith's spoken reply message and, at step 1285, converts it into an audio file. Voice server 230 provides the audio file to gateway 231. At step 1290, gateway 231 attaches the audio file to the reply message, e.g., in field 1345 of form 1330, and at step 1295, sends the reply message to the recipient's address. In another embodiment, the spoken reply message recorded at step 1280 may be converted into a text message by means of a conventional voice-to-text conversion application. In this case, the converted text message may be inserted into field 1345 on form 1330; the reply message is then sent to the recipient as a text message.

Suppose instead that after hearing the Johannes Taylor message read, Mr. Smith wishes to forward the email message to a third party. Accordingly, Mr. Smith may say, "Forward," or, alternatively, press a predetermined key on his telephone. As a result, Mr. Smith is reconnected to the operator, and gateway 231 presents a GUI containing a forward email form on terminal 220. FIG. 16B illustrates an example of a forward email form 1370 that may be presented. Form 1370 comprises field 1372 for entry of an address of the intended recipient of the forward email message, field 1374 for entry of an address of the sender of the message (which in the case of a forward email message is the address of the user), and field 1376 for entry of a description of the subject of the message. Field 1385 is used for entry of any additional message that the user wishes to add to the original message. Field 1386 contains the original message.

The operator may then ask Mr. Smith to specify a recipient's address, and once an address is obtained, enter it into field 1372 on form 1370. It should be noted at this point that entry of an email address may be automatic if Mr. Smith also subscribes to a private directory service, e.g., a MetroDex service, which provides contact information including an email address(es) once the contact (or the email recipient in this instance) is identified. For details on the MetroDex service, one may refer, e.g., to copending, commonly assigned U.S. application Ser. No. 09/441,656 filed on Nov. 12, 1999, incorporated herein by reference.

Several fields in form 1370 are populated automatically based on the header information data in the original email message. Thus, for example, gateway 231 copies the subject line data from the original email message to subject field 1376 in form 1370. Gateway 231 also copies the text of the original message to original message field 1386 of form 1370. Gateway 231 may also access Mr. Smith's email folder, retrieve Mr. Smith's default reply address from field 730 of record 710, and insert the default reply address into sender address field 1374 of form 1370. Alternatively, the operator may prompt Mr. Smith to specify a sender address, obtain an address from Mr. Smith verbally, and enter the address into field 1374.

The operator may then ask Mr. Smith if he wishes to add his own message to the forward email message. If he answers in the affirmative, Mr. Smith may be connected to voice server 230 to create a voice audio file. Voice server 230 records Mr. Smith's spoken message and converts it into an audio file. Voice server 230 provides the audio file to gateway 231. Gateway 231 attaches the audio file to the forward email message, e.g., in field 1385 of form 1370, and sends the forward message to the recipient's address. In an alternative embodiment, the spoken message may be converted into a text message, e.g., by a voice-to-text conversion application. In that case, the converted text message may be inserted into field 1385 on form 1370; the forward email message is then sent to the recipient as a text message.

In another embodiment, a user may specify one or more parameters that may be used to control which email messages are presented to him or her. For example, a user may be afforded the option of selecting among several different types of "message filters." To enable this functionality, a set of tables such as those shown in FIGS. 17A-D may be stored in the user's email folder. Filter option table 1610 in FIG. 17A comprises three fields 1612-1614 and indicates which message filter, if any, the user has selected. Each of fields 1612-1614 contains a binary flag value. If each of fields 1612-1614 contains a flag value "0," the user has not selected a filter, and new email messages are presented to the user in the manner described above. However, if field 1612 contains a flag value "1," a "time range filter" is applied to the email messages in the user's email accounts, i.e., only those email messages that were received between a first specified date/time and a second specified date/time are presented to the user. If field 1613 contains a value "1," a "sliding time window filter" is applied, i.e., only those email messages that were received within a specified time period before the date and time at which the user call is received, are presented to the user. If field 1614 contains a value "1," an "address filter" is applied to the user's email messages, i.e., only email messages that were received from any one of predetermined email addresses are presented to the user. A user may be prompted either upon registration (online or offline) or at a later time to specify a message filter(s). For example, the user may set up the message filter(s) online on his/her own at any time at a predetermined URL associated with the Voice Email™ service.

Figure 17A:
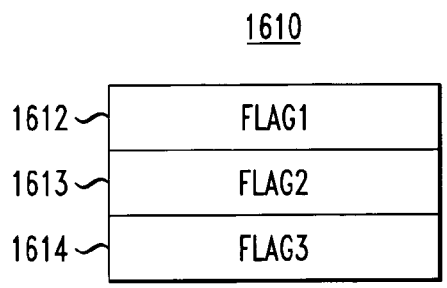
FIGS. 17A-17D illustrate a set of tables in the user's email folder to facilitate message filtering functions.
Figure 17B:
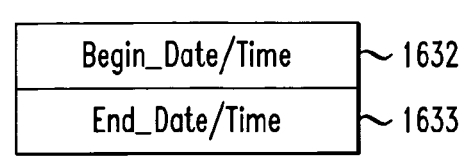
Figure 17C:
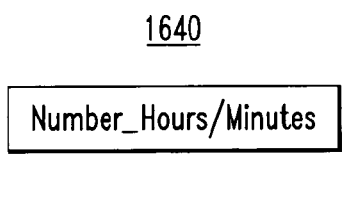
Figure 17D:
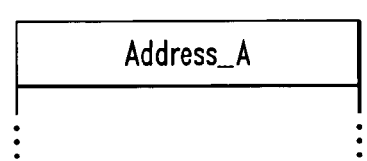

However, in this illustrative embodiment, the user sets up the message filter(s) through the agency of an operator. Suppose that Mr. Smith tells the operator that he wants to hear only messages that were sent between Jun. 1, YYYY 01:00:00 a.m. and Jun. 14, YYYY 11:30:00 p.m. Accordingly, the operator sets up a time range filter by entering these dates and times into appropriate fields on terminal 220, and, in response, gateway 231 inserts these sets of dates and times into time parameters table 1630 in FIG. 17B. In this instance, the parameter Begin_Date/Time in field 1632 assumes a value representing Jun. 1, YYYY/01:00:00 a.m., and the parameter End_Date/Time in field 1633 assumes a value representing Jun. 14, YYYY/11:30:00 p.m. Gateway 231 also assigns a flag value "1" to field 1612 in filter option table 1610, indicating the time range filter is active. FIGS. 17A and B illustrate tables 1610 and 1630 resulting from Mr. Smith's specifying the parameters Begin_Date/Time and End_Date/Time as described above.

Figure 18A:
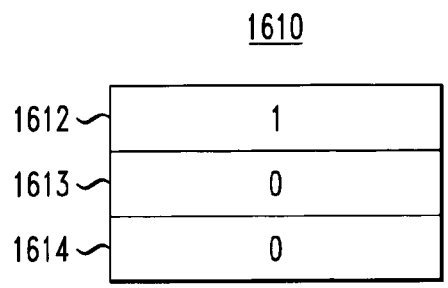
FIGS. 18A-18B illustrate a filter option table and a time parameters table resulting from setting up a time range message filter.
Figure 18B:
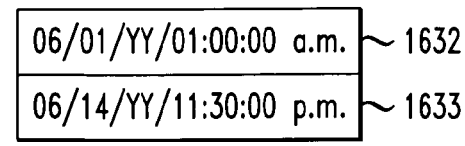
Figure 19:
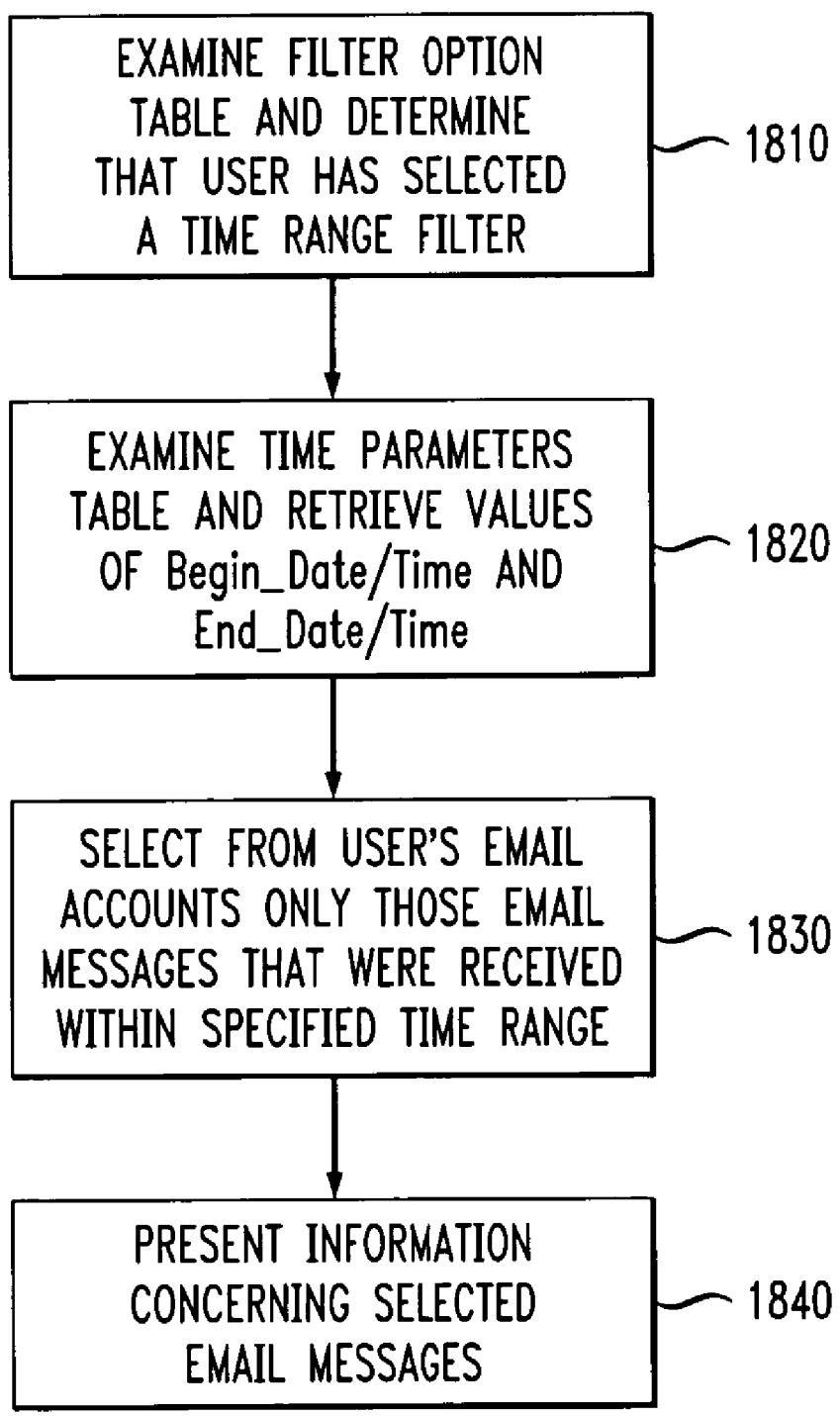
FIG. 19 is a flowchart depicting a routine for screening email messages using the time range message filter.

FIG. 19 illustrates a routine for providing information concerning email messages in a user's email accounts subject to a time range filter. At step 1810, gateway 231 examines filter option table 1610 in FIG. 18A and determines that, because field 1612 contains a flag value "1," Mr. Smith has selected a time range filter. Accordingly, at step 1820, gateway 231 examines time parameters table 1630 and retrieves the values of Begin_Date/Time and End_Date/Time, which in this instance are Jun. 1, YYYY/01:00:00 a.m. and Jun. 14, YYYY/11:30:00 p.m. After obtaining these values, gateway 231 at step 1830 selects from Mr. Smith's email accounts only those email messages that were received within the specified time range. Referring back to FIG. 9A, for example, gateway 231 selects from Mr. Smith's inbox associated with Address1 the email message from Keld at line 794, which was sent on Saturday, Jun. 12, YYYY, and thus satisfies the specified time range. In this example, gateway 231 also selects the email messages from Sarah Chang per entry 795, the message from Mike Sullivan per entry 796 and the message from Keld per entry 797. Gateway 231 also examines Mr. Smith's email accounts at Address2 (FIG. 9B) and Address3 (FIG. 9C), and selects all email messages that satisfy the specified time range. At step 1840, gateway 231 presents information concerning the selected email messages to the operator in a GUI on terminal 220. FIG. 20 illustrates one such GUI denoted 1730. GUI 1730 displays only those email messages in Mr. Smith's email accounts that were received between (in this case inclusive of) Jun. 1, YYYY/01:00:00 a.m. and Jun. 14, YYYY/11:30:00 p.m. For example, the email from Keld in entry 794 in FIG. 9A is listed as entry 1742 in GUI 1730. At this point, the operator may read the header information in GUI 1730 to Mr. Smith; alternatively, gateway 231 may initiate a "Read Headers" routine and cause voice server 230 to read the header information automatically.

Suppose that Mr. Smith instead asks the operator to set up a sliding time window filter so that whenever he calls to receive an update concerning his email accounts, only those email messages that were received during the past two days are reported. In this case, referring to FIG. 17C, the length of the time window specified by Mr. Smith is stored in table 1640, which comprises a Number_Hours/Minutes field. Accordingly, the operator may enter "48:00" in a predetermined field on terminal 220, and gateway 231 in response may insert the value "48:00" into table 1640. Consequently, the Number_Hours/Minutes assumes the value "48:00." Gateway 231 also assigns a flag value "1" to field 1613 of filter option table 1610, indicating that the sliding time window filter is active.

Subsequently, if Mr. Smith asks the operator for the status of his email accounts, gateway 231 examines filter option table 1610 and determines that, because field 1613 contains a flag value "1," Mr. Smith has selected a sliding time window filter. Accordingly, gateway 231 examines table 1640 and finds that the Number_Hours/Minutes field therein contains the value "48:00." Accordingly, gateway 231 may generate on terminal 220 a GUI presenting information concerning only those email messages that were received in the last two days. Alternatively, gateway 231 may initiate a "Read Headers" routine and cause voice server 230 to read the header information concerning such email messages to the user.

Suppose that Mr. Smith asks the operator to set up an address filter so that only email messages received from one or more selected email addresses are presented to him when he checks email messages in his accounts. For example, Mr. Smith may ask that he only be presented email messages that are received from Johannes Taylor. Mr. Smith provides the email address of Johannes Taylor, say, 'JT_address,' and the operator enters 'JT_address' into an appropriate field on terminal 220. In response, gateway 231 enters 'JT_address' into table 1675, which in this example comprises only one field. It should be noted that a user may provide multiple addresses, and thus table 1675 may comprise multiple fields each holding a different address. Gateway 231 also assigns a flag value "1" to field 1614 of filter option table 1610.

Figure 21:
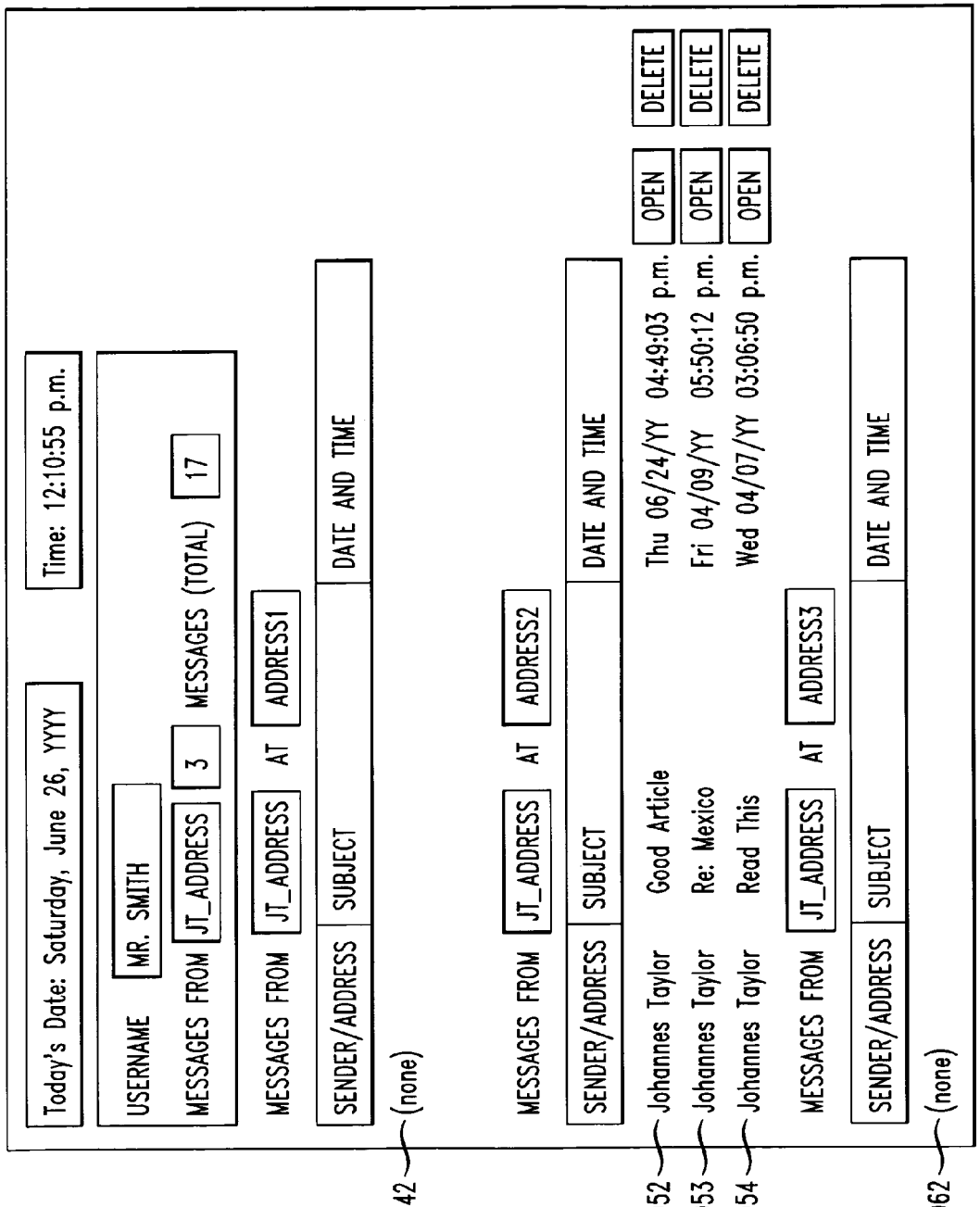
FIG. 21 illustrates a GUI containing information concerning email messages received from a selected sender's address, in accordance with a message address filter.

Subsequently, if Mr. Smith asks the operator for the status of his email accounts, gateway 231 examines filter option table 1610 and determines that, because field 1614 contains a flag value "1," Mr. Smith has selected an address filter. Accordingly, gateway 231 examines table 1675 and retrieves the address 'JT_address.' Gateway 231 then retrieves from Mr. Smith's three email accounts any emails that were received from 'JT_address.' Since 'JT_address' is the email address of Johannes Taylor, gateway 231 may generate on the operator terminal 220 a GUI displaying only email messages received from Johannes Taylor. For example, gateway 231 may generate GUI 2030 as shown in FIG. 21, which lists the email messages from Johannes Taylor that were received in Mr. Smith's three email accounts. Referring to GUI 2030, entry 2042 indicates that no email messages from Johannes Taylor are present in the email account at Address1. Three email messages from Johannes Taylor are shown at entries 2052-2054 in the email account at Address2; and no email messages from Johannes Taylor are present in the account at Address3 (line 2062).

It should be noted that message filters are not necessarily mutually exclusive. For example, Mr. Smith may choose to select both a time range filter and an address filter, in which case gateway 231 may cause only email messages sent from a selected group of addresses between a first specified date/ time and a second specified date/time to be presented to Mr. Smith. Other possibilities may also be possible. It should also be noted that although only three message filter options are described in the illustrative example, any number of filter options may be made available to users of the information assistance service.

It should also be noted that an operator may, at the request of a user, override any pre-existing message filters and cause gateway 231 to select and present email messages satisfying parameters specified during the user's call. For example, suppose that Mr. Smith has previously established a sliding time window filter to show only those email messages that were sent during the past 48 hours. Nevertheless, Mr. Smith may call the information assistance service and ask to hear header information for all email messages sent in the past six months. In response, the operator may override Mr. Smith's existing parameter settings and cause gateway 231 to select all email messages from Mr. Smith's accounts that were sent during the past six months. Gateway 231 accordingly presents a GUI to the operator displaying the requested email messages, and the operator may report the results to Mr. Smith.

In yet another instance, a user may specify an email address, referred to as an "alert address," in his/her email folder, to which notices are sent when new email messages arrive in his/her email accounts. Gateway 231 may accordingly access the user's email accounts automatically and periodically to verify the status thereof. Whenever gateway 231 detects that a new email has arrived in one of the user's email accounts, gateway 231 causes an "alert" message, in the form of, e.g., a text message, to the alert address specified in the user's email folder.

Enhance Command Emulation Feature in Accordance with the Invention

As described above, Voice E-mail™ messages may be accessed and handled by a user through interaction with voice server 230. In accordance with an embodiment of the invention, users are allowed to select his/her preferred command set. The commands in the preferred command set emulate those of one or more ESAs, commands that are defined as default commands or commands that are issued in the form of a series of signals, such as DTMF tones.

In this illustrative embodiment, database 20 stores command data records comprising command data for enabling the issuance and recognition of commands used to implement Voice E-mail™ service functions. Referring to table 2200 of FIG. 22, storage of command data and the association of such data to form command data records is illustrated. In this instance, data respecting twenty two command types are provided as follows: Create 2220 which relates to composing a new Voice E-mail™ message; Reply 2222 which relates to composing a new Voice E-mail™ message that is addressed to the sender of a Voice E-mail™ message which was received by the user; Forward 2224 which relates to, for example, composing a new Voice E-mail™ message that attaches a previously received Voice E-mail™ message and that may be addressed to recipient(s) other than the sender of the previously received Voice E-mail™ message; Delete 2226 which relates to erasing of one or more Voice E-mail™ messages; Tools 2228 which relates to certain Voice E-mail™ messaging options, such as email tracking, automated out of office replies, and the like; Attach 2230 which relates to attaching one or more documents (e.g., voice memo, voice-mail message, etc.) to a Voice E-mail™ message; Find 2232 which relates to searching for a stored Voice E-mail™ message; Send 2234 which relates to transmitting an outgoing Voice E-mail™ message; Draft 2236 which relates to saving a new Voice E-mail™ message for possible subsequent transmission; New Mail 2238 which relates to checking the Voice E-mail™ system for newly received Voice E-mail™ messages; Delivery 2240 which relates to available delivery options, such as assigning a priority level (e.g., high priority message) or requesting a return receipt; . . . ; Previous Message 2248 enables a user to navigate to the previous Voice E-mail™ message in storage; Next Message 2250 enables a user to navigate to the next Voice E-mail™ message in storage; List Messages 2252 which relates to the recitation of stored Voice E-mail™ messages; Addresses 2254 which relates to availing a directory of contacts for addressing a Voice E-mail™ message; Read Header 2256 relates to having email header information (such as email date, contact information and subject) conveyed to the user; Open Message 2258 relates to having the email message opened and the body of the email read to the user; Repeat 2260 relates to having the immediately prior operator- or VRU-generated communication repeated; and Operator 2262 relates to summoning an operator for user assistance.

In accordance with an embodiment of the invention, one or more words, phrases and/or unique signal sequences (comprising, e.g., DTMF signals) may be associated with each of the aforementioned command types. The words or phrases used often varies, depending on the command set categories (e.g., ESA-specified, default) made available by the service. Accordingly, the particular word or phrase assigned to a command type, in many cases, is derived from the command language used by one or more ESAs. Thus, referring again to table 2200, the command data that is associated with a command type may comprise a word or phrase that is used by ESAs (indicated in Lotus Notes field 2210, Optimum Online field 2212, Yahoo! Mail field 2214), a word or phrase that is designated as default (indicated in Default field 2216) or a signal (indicated in signal field 2218) as designated by the Voice E-mail™ service.

For example, a Voice E-mail™ service may be configured such that new Voice E-mail™ messages may be created when one of the following commands are received from a user: a voice command of "New Memo," a voice command of "Compose," and a signal command of DTMF signals "*01," the listed voice commands may be provided to the user by voice server 230 such that a user is prompted to respond with the designated word, phrase or signal that is presented. Thus, in this latter example, a user may be presented with the following instruction by server 230: "To create a new Voice E-mail™ message, say 'compose' or press '*01.'"

The commands that enable various Voice E-mail™ messaging functions is, in one illustrative embodiment, provided by table 2200 of FIG. 22. For example, command type 2220 relates to the function of creating a new Voice E-mail™ message. Associated with command type 2220, and stored in database 20, are the specific voice commands and a signal command that effectuate such function. In this particular illustrative embodiment, the following types of commands are supported by Voice E-mail™ service: Lotus Notes commands, Optimum Online commands, Yahoo! Mail commands, Default commands and signal commands, as indicated by field designations 2210, 2212, 2214, 2216 and 2218. More specifically, table 2200 indicates that the following voice commands may be used—if selected by a user or operator—to create a new Voice E-mail™ message: "New Memo" and "Compose." (This is indicated by the language that is provided in the row designated by Create 2220 of table 2200, after the LN_, OO_, YM_ and DF_ prefixes, which indicate the ESA affiliation—i.e., Lotus Notes command, Optimum Online command, Yahoo! Mail command, Default command, respectively.) In addition, table 2200 indicates that a new Voice E-mail™ message can be created in response to receiving "*01" DTMF signals.

For example, a user that is proficient with Yahoo! Mail's email service can specify the Yahoo! Mail command set as the user preferred command set. In accordance with an embodiment of the invention, specifying such a preference enables a user to operate the functions of the Voice E-mail™ service by receiving and issuing commands listed in the Yahoo! Mail field 2214 of table 2200. However, to foster user-friendliness of the Voice E-mail™ service, even if the user issues other well known commands corresponding to those in his/her preferred command set, by associating various well known commands for each command type as in table 2200, the Voice E-mail™ service is configured to recognize the various commands for effectuating a given Voice E-mail™ function.

It should be noted that any function that requires a command but does not have a corresponding ESA command, such as in this example a corresponding Yahoo! Mail-specified command, may be effectuated by issuing the associated default command. Thus, if a user prefers a command set having Yahoo! Mail format, voice server 230 may nevertheless provide such user with, for example, a Read Header command 2256 or a Repeat command 2260—even though these commands are not part of the Yahoo! Mail command set. Upon identifying that the preferred Yahoo! Mail command set does not provide a command for such functionality, voice server 230 next reviews the commands of the default category 2216 to identify the appropriate responsive commands.

In accordance with an embodiment of the invention, the type of commands that are issued by voice server 230 for selection by a user may be specified by the user and stored in a user's email folder. This typically occurs when a user registers with the Voice E-mail™ service. As shown in FIG. 23, such registration process includes not only above-described steps 320, 330, 340 350 and 360 of the registration process of FIG. 5, but also step 2335 where an operator may elicit from the user a preferred command format to be emulated to manage his/her email through the Voice E-mail™ service. The following illustrates one such elicitation:

(1) The Voice E-mail™ service responds to commands that are provided by the user and/or commands that are issued by the service and confirmed by the user through voice or DTMF signal inputs;

(2) Various command formats are available, including ESA-specific formats (such as Yahoo! Mail commands, Optimum Online Webmail commands, etc.), default commands, DTMF signal commands, or a combination of two or more of the aforementioned command formats; and (3) One or more command formats may be selected by the user by stating the name(s) of the format(s)—e.g., Yahoo! Mail format, Optimum Online Webmail format, default format, DTMF signal format, all formats, etc.; otherwise the command set format(s) will be selected by the service (e.g., default and DTMF signal commands).

FIG. 24 illustrates email folder record 2410 resulting from the process of FIG. 23. Record 2410 illustratively is maintained in an email folder of a hypothetical user named Mr. Smith, including the specification of the user preferred email command set to be emulated by the Voice E-mail™ service. Thus, record 2410 includes not only above-described fields 720, 2423, 725, 730, 761*a-b*, 762*a-b* and 763*a-b* of record 710, but also field 2423 which contains Mr. Smith's preferred command format designation, e.g., Yahoo! Mail command format in this instance.

Once a user's command format preference is established and the data relating thereto is stored in the user's email folder, such preferences may be ascertained by gateway 231 each time the user calls the information assistance service in connection with the Voice E-mail™ service. FIG. 25 illustrates a routine for ascertaining a user's preferred command format when accessing the Voice E-mail™ service. At step 2510, after the user logs on to the service, gateway 231 obtains the user identifying data, e.g., the user's phone number, username, password, PIN, voiceprint or other login information. At step 2520, gateway 231 identifies the user preferred command format from record 2410 associated with the user based on the user identifying data, e.g., Yahoo! Mail command format as indicated in field 2423 in FIG. 24. As a result, gateway 231 at step 2530 provides voice server 230 with access to the commands in the preferred command format to emulate a Yahoo! Mail user interface in this instance. That is, the user can interact with server 230 using the commands in the Yahoo! Mail command format in this instance.

It should be noted that, where one or more command sets are selected and stored in the user's email folder, the Voice E-mail™ service is configured to provide commands for user selection that match the commands of the ESA-specified command set. The default and DTMF signal commands for a given function may only be issued by voice server 230 in instances where there is no ESA-specified command for the service functionality being implemented. It should be further noted, however, that when the user (rather than the service) issues a command, voice server 230 may be configured to recognize any of the ESA-specified commands (if any), corresponding default command, or corresponding DTMF signal command.

The foregoing merely illustrates the principles of the invention. It will thus be appreciated that those skilled in the art will be able to devise numerous other arrangements that embody the principles of the invention and are thus within the spirit and scope of the invention, which is defined by the claims below.

For example, although a user may establish command set preferences when registering with the inventive Voice E-mail™ service, such preferences may also be established (or changed) at any time after user registration.

In addition, it should be noted that, although numerous commands for operating the Voice E-mail™ service have been described, additional or fewer functions may be made available, thereby affecting the number and types of commands provided by the service.

Moreover, if a user does not establish command set preferences, the Voice E-mail™ service itself may select one or more formats on behalf of the user. In one embodiment, voice server 230 is programmed to issue commands from a default command set and is programmed to recognize such commands or DTMF signal commands from the user. In another embodiment, voice server 230 seeks to determine which ESAs the user emulates and selects the emulated ESA format as the user's preferred format.

Finally, information/call center 200 and its components are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for providing information assistance, comprising:

storing first data concerning access to one or more email accounts associated with a user;

storing second data of a user selected e-mail navigation commands set, said commands set being one or more verbal commands that emulate email navigation commands of at least one of said email accounts associated with said user such that said verbal commands may be used for managing said email messages through an automated operator using said email navigation commands set, wherein designation of said verbal commands is at the discretion of said user, regardless of the nominal names of said navigation commands defined by said email account, wherein one single verbal command is used to access a plurality of said email accounts and each of said plurality of said email accounts is associated with each of a plurality of various email systems;

receiving a communication from the user through a first communications connection;

retrieving the first and second data;

accessing, over a second communications connection, the one or more email accounts associated with said user; and performing, on behalf of the user, at least one operation with respect to at least one email message received in at least one of the email accounts, wherein the at least one operation is performed via said automated operator in response to a command in the email navigation commands so whose designation is indicated by the second data.

2. The method of claim 1 wherein the designation specifies one or more email service application (ESA) formats.

3. The method of claim 1 wherein the designation specifies at least a default format.

4. The method of claim 1 wherein the designation specifies at least a signaling format.

5. The method of claim 4 wherein the signaling, format involves DTMF signaling.

6. The method of claim 1 wherein the commands in the set are in more than one ESA format.

7. The method of claim 1 wherein the commands in the set include one or more commands made up by the user.

8. The method of claim 1, wherein the communication includes a telephone call.

9. The method of claim 1, further comprising the step of providing a list of options to said caller based on said second data.

10. The method of claim 1, further comprising the step of providing at plurality of defaults option for set of interaction commands for managing email messages, said default options each relating to a different e-mail service.

11. A method for use by an information assistance provider, comprising:

storing first data concerning access to one or more email accounts associated with a user;

storing second data of one or more user selected email navigation commands set, said commands set being one or more verbal commands that emulate email navigation commands of at least one of said email accounts associated with said user such that said verbal commands may be used for managing said email messages through an automated operator using said email navigation commands set, wherein designation of said verbal commands is at the discretion of said user, regardless of the nominal names of said navigation commands defined by said email account and wherein the first and second data being stored in association with third data representing the user, wherein one single verbal command is used to access a plurality of said email accounts and each of said plurality of said email accounts is associated with each of a plurality of various email systems;

receiving a communication from the user;

obtaining the third data during the communication;

retrieving the first and second data based on the third data;

using the first data to access the one or more email accounts associated with the user; and providing, to the user, information concerning at least one email message received in at least one of the one or more email accounts in response to a command submitted by said user through said automated operator in the user preferred format of one or more user selected email navigation commands indicated by the second data.

12. The method of claim 11 wherein the user preferred format is derived from one it more ESA formats.

13. The method of claim 11 wherein the user preferred format includes at least a signaling format.

14. The method of claim 13 wherein the signaling format involves DTMF signaling.

15. The method of claim 11 wherein the commands in the user preferred format include one or more commands made up by the user.

16. The method of claim 11, wherein the information assistance provider includes an operator.

17. The method of claim 11, wherein the information assistance provider includes a voice server.

18. The method of claim 1, wherein the one or more email accounts are furnished by one or more providers unaffiliated with the information assistance provider.

19. The method of claim 11, wherein the communication includes a telephone call.

20. The method of claim 19, wherein the third data includes an automatic number identification (ANI).

21. The method of claim 11, wherein the third data includes a password.

22. The method of claim 11, wherein the third data includes a PIN.

23. The method of claim 11, wherein the third data includes a voiceprint.

24. A system for providing information assistance, comprising:

storage for storing first data concerning access to one or more email accounts associated with a user, and second data of a user selected email navigation commands set, said commands set being one or more verbal commands that emulate email navigation commands of at least one of said email accounts associated with said user such that said verbal commands may be used for managing said email messages through an automated operator using said email navigation commands set, wherein designation of said verbal commands is at the discretion of said user, regardless of the nominal names of said navigation commands defined by said email account, wherein one single verbal command is used to access a plurality of said email accounts and each of said plurality of said email accounts is associated with each of a plurality of various email systems;

an interface for receiving a communication from the user through a first communications connection, the first and second data being retrieved from the storage; and a processor configured to access, over a second communications connection, the one or more email accounts associated with said user, at least one operation with respect to at least one email message received in at least one of the email accounts being performed on behalf of the user, wherein the at least one operation is performed via said automated operator in response to said email navigation commands in the set whose designation is indicated by the second data.

25. The system of claim 24 wherein the designation specifies one or more email service application (ESA) formats.

26. The system of claim 24 wherein the designation specifies at least a default format.

27. The system of claim 24 wherein the designation specifies at least a signaling format.

28. The system of claim 27 wherein the signaling format involves DTMF signaling.

29. The system of claim 24 wherein the commands in the set are in more than one ESA format.

30. The system of claim 24 wherein the commands in the set include one or more commands made up by the user.

31. The system of claim 24, wherein the communication includes a telephone call.

32. The system of claim 24, further comprising the step of providing a list of options to said caller based on said second data.

33. The system of claim 24, further comprising the step of providing at plurality of delimits option for set of interaction commands for managing email messages, said default options each relating to a different e-mail service.

34. A system for use by an information assistance provider, comprising:
    storage for storing first data concerning access to one or more email accounts associated with a user, and second data of one or more user selected email navigation commands set, said commands set being one or more verbal commands that emulate email navigation commands of at least one of said email accounts associated with said user such that said verbal commands may be used for managing said email messages occurs through an automated operator using said email navigation commands set, wherein designation of said verbal commands is at the discretion of said user, regardless of the nominal names of said navigation commands defined by said email account and wherein and wherein the first and second data being stored in association with third data representing the user;
    an interface for receiving a communication from the user, the third data being obtained during the communication;
    a mechanism for retrieving the first and second data based on the third data, the first data being used to access the one or more email accounts associated with said user, wherein one single verbal command is used to access a plurality of said email accounts and each of said plurality of said email accounts is associated with each of a plurality of various email systems; and
    a processor configured to provide, to the user, information concerning at least one email message received in at least one of the one or more email accounts in response to a command submitted by said user through said automated operator in the user preferred format of one or more user selected email navigation commands indicated by the second data.

35. The system of claim 34 wherein the user preferred format is derived from One or more ESA formats.

36. The system of claim 34 wherein the user preferred format includes at least a signaling format.

37. The system of claim 36 wherein the signaling format involves DTMF signaling.

38. The system of claim 34 wherein the commands in the user preferred format include one or more commands made up by the user.

39. The system of claim 34, wherein the information assistance provider includes an operator.

40. The system of claim 34, wherein the information assistance provider includes a voice server.

41. The system of claim 34, wherein the one or more email accounts are furnished by one or more providers unaffiliated with the information assistance provider.

42. The system of claim 34, wherein the communication includes a telephone call.

43. The system of claim 42, wherein the third data includes an ANI.

44. The system of claim 34, wherein the third data includes a password.

45. The system of claim 34, wherein the third data includes a PIN.

46. The system of claim 34, wherein the third data includes a voiceprint.

* * * * *